(12) United States Patent
Nakaishi

(10) Patent No.: US 12,496,856 B2
(45) Date of Patent: Dec. 16, 2025

(54) PNEUMATIC TIRE

(71) Applicant: TOYO TIRE CORPORATION, Itami (JP)

(72) Inventor: Ayaki Nakaishi, Itami (JP)

(73) Assignee: Toyo Tire Corporation, Itami (JP)

( * ) Notice: Subject to any disclaimer, the term of this patent is extended or adjusted under 35 U.S.C. 154(b) by 51 days.

(21) Appl. No.: 18/624,861

(22) Filed: Apr. 2, 2024

(65) Prior Publication Data

US 2024/0383285 A1 Nov. 21, 2024

(30) Foreign Application Priority Data

May 19, 2023 (JP) ................................. 2023-082970
May 19, 2023 (JP) ................................. 2023-082972
May 19, 2023 (JP) ................................. 2023-082974

(51) Int. Cl.
  *B60C 11/03* (2006.01)
  *B60C 11/12* (2006.01)

(52) U.S. Cl.
  CPC ... *B60C 11/1263* (2013.01); *B60C 2011/0346* (2013.01); *B60C 2011/0353* (2013.01); *B60C 2011/0355* (2013.01); *B60C 2011/0358* (2013.01)

(58) Field of Classification Search
  CPC ......... B60C 11/0304; B60C 2011/0341; B60C 2011/0346; B60C 2011/0353
  See application file for complete search history.

(56) References Cited

U.S. PATENT DOCUMENTS

| | | | | |
|---|---|---|---|---|
| D432,961 S | * | 10/2000 | Guspodin | D12/519 |
| D444,428 S | * | 7/2001 | Hutz | B60C 11/1315 |
| | | | | D12/522 |
| D483,005 S | * | 12/2003 | Hirai | D12/519 |
| D644,982 S | * | 9/2011 | Lee | D12/527 |
| D752,504 S | * | 3/2016 | Sareen | D12/521 |
| D771,552 S | * | 11/2016 | Umstot | D12/531 |
| D971,124 S | * | 11/2022 | Kuniak | D12/532 |
| 2013/0240103 A1 | * | 9/2013 | Maehara | B60C 11/0306 |
| | | | | 152/209.25 |
| 2019/0176528 A1 | | 6/2019 | Ito | |

FOREIGN PATENT DOCUMENTS

JP 2019-104411 A 6/2019

* cited by examiner

*Primary Examiner* — Kendra Ly
(74) *Attorney, Agent, or Firm* — WHDA, LLP

(57) ABSTRACT

A pneumatic tire provided on a tread with an outer center circumferential groove, an inner center circumferential groove, an outer shoulder circumferential groove that extend linearly in a tire circumferential direction, and an inner shoulder circumferential groove extending in a zig-zag pattern in the tire circumferential direction. The groove width of the outer center circumferential groove and the groove width of inner center circumferential groove are narrower than the groove width of the outer shoulder circumferential groove and the groove width of the inner shoulder circumferential groove, respectively.

19 Claims, 6 Drawing Sheets

PNEUMATIC TIRE

CROSS-REFERENCE TO RELATED APPLICATIONS

This application claims priority of Japanese Patent Applications No.: 2023-082970 filed on May 19, 2023, No.: 2023-082972 filed on May 19, 2023, and No.: 2023-082974 filed on May 19, 2023, the contents of which are incorporated herein by reference.

BACKGROUND

Technical Field

The present invention relates to a pneumatic tire.

Related Art

JP 2019-104411 A discloses a pneumatic tire including, on the tread, a pair of center circumferential grooves and a pair of shoulder circumferential grooves. The pair of center circumferential grooves are positioned on both sides of the tire equator, respectively, in the axle direction, and extend in the circumferential direction of the tire, in a vehicle-mounted state. Each of the pair of shoulder circumferential grooves is positioned on the opposite side of corresponding one of the center circumferential grooves, with respect to the tire equator, and extends in the circumferential direction of the tire, in the vehicle-mounted state. In this pneumatic tire, the pair of center circumferential grooves have groove widths narrower than that of the pair of shoulder circumferential grooves, respectively.

SUMMARY

According to JP 2019-104411 A, since the pair of center circumferential grooves have groove widths narrower than those of the pair of shoulder circumferential grooves, respectively, it is possible to ensure a wider center land, which is defined between the pair of center circumferential grooves, in the tire axis direction, than that in a configuration in which the pair of center circumferential grooves have groove widths equal to or larger than those of the pair of shoulder circumferential groove. It is known that, when vehicles, light trucks in particular, are vacant without any load, the grounding load tends to concentrate on the center land. Since a larger width is ensured in the center land, where the grounding load tends to concentrate on vacant vehicles, in the tire axis direction, it is possible to ensure the traction performance when the vehicle is vacant.

In the tire disclosed in JP 2019-104411 A, by contrast, since the pair of shoulder circumferential grooves have groove widths relatively wider than those of the pair of center circumferential grooves, respectively, resulting in narrow-width outer shoulder lands, which are defined by the pair of shoulder circumferential grooves, respectively, on the opposite side of the tire equator in the tire axis direction, so that the rigidity of the pair of outer shoulder lands can deteriorate. It is known that the outer shoulder lands of the tires mounted on steering wheels, e.g., front wheels, are more likely to be subjected to greater lateral force in the axle direction, as the front wheels are steered. Therefore, when the tire of JP 2019-104411 A is mounted on a steering wheel, the outer shoulder land wears out more quickly, so that what is called shoulder wear, in which the outer side of the outer shoulder land wears out more quickly than the inner side, tends to take place more quickly.

In particular, in case where the vehicle is an electric vehicle (EV) light truck, the vehicle has a greater mass and a higher acceleration performance, compared with the conventional engine-driven vehicles. Therefore, the tire mounted on the steering wheel of the EV light truck, shoulder wear, in which the outer side of the shoulder lands wears out more quickly than the inner side, takes place more quickly, compared with a tire mounted on a conventional engine-driven vehicle, and also higher traction performance is further required.

Therefore, an object of the present invention is to provide a pneumatic tire capable of suppressing the shoulder wear on a shoulder land as well as of ensuring traction performance, while ensuring the traction performance of the center land during the vacancy of the vehicle.

To begin with, an aspect of the present invention provides a pneumatic tire having on a tread:

an outer center circumferential groove that is positioned on an outer side with respect to a tire equator in an axle direction in a vehicle-mounted state, and that extends in a tire circumferential direction;

an inner center circumferential groove that is positioned on an inner side with respect to the tire equator in the axle direction in the vehicle-mounted state, and that extends in the tire circumferential direction;

an outer shoulder circumferential groove that is positioned on an outer side with respect to the outer center circumferential groove in the axle direction in the vehicle-mounted state, and that linearly extends in the tire circumferential direction; and an inner shoulder circumferential groove that is positioned on an inner side with respect to the inner center circumferential groove in the axle direction in the vehicle-mounted state, and that extends in a zig-zag pattern in the tire circumferential direction, wherein the outer center circumferential groove and the inner center circumferential groove have groove widths narrower than a groove width of the outer shoulder circumferential groove and a groove width of the inner shoulder circumferential groove, respectively.

According to the present invention, since the groove width of the outer center circumferential groove and the groove width of the inner center circumferential groove are narrower than the groove width of the outer shoulder circumferential groove and the groove width of the inner shoulder circumferential groove, respectively, larger widths can be ensured for the center land, which is defined between the outer and inner center circumferential grooves, an outer quarter land that is defined between the outer center circumferential groove and the outer shoulder circumferential groove, and an inner quarter land that is defined between the inner center circumferential groove and the inner shoulder circumferential groove, respectively, in the tire axis direction, compared with a configuration in which the groove widths of the outer and inner center circumferential grooves are wider or equal to the groove widths of the outer and inner shoulder circumferential grooves, respectively. When the pneumatic tire according to the present invention is mounted on a vehicle such as a truck, and the truck is vacant, the grounding load tends to concentrate on the center land. Therefore, according to the present invention, since the center land is configured to have a larger width, where the grounding load is more likely to concentrate on vacant vehicles, in the tire axis direction, it is possible to ensure the traction performance during the vacancy of the vehicle.

Furthermore, since the outer shoulder circumferential groove extends linearly, an outer shoulder land defined on the outer side with respect to the outer shoulder circumferential groove in the axle direction also extends linearly along the tire circumferential direction. As a result, the outer shoulder land has no any edge component extending in the tire axis direction. Therefore, the rigidity of the outer shoulder land in the tire circumferential direction can be increased uniformly, as compared with a configuration in which the outer shoulder circumferential groove extends in a zig-zag pattern in the tire circumferential direction. When the pneumatic tire according to the present invention is mounted on a steering wheel, such as a front wheel, the outer shoulder land is more likely to be subjected to greater lateral force in the axle direction, as the front wheels are steered. According to the present invention, since the rigidity of the outer shoulder land can be increased uniformly along the tire circumferential direction, shoulder wear, in which the outer side of the shoulder land wears out more quickly than the inner side, is suppressed.

Furthermore, since the inner shoulder circumferential groove extends in a zig-zag pattern, an inner shoulder land that is defined by the inner shoulder circumferential groove, on the inner side in the axle direction, extends in a zig-zag pattern along the tire circumferential direction. As a result, the inner shoulder land has an edge component extending in the tire axis direction, and this edge component serves as a traction element.

Therefore, with the pneumatic tire according to the present invention, while enabling the center land to ensure the traction performance of the pneumatic tire during the vacancy, it is possible to suppress the shoulder wear, in which the outer side of the outer shoulder land wears out more quickly than the inner side, and ensure the traction performance at the same time.

The groove width of the outer shoulder circumferential groove and the groove width of the inner shoulder circumferential groove may be 1.2 times or more and 4.0 times or less the groove width of the outer center circumferential groove and the inner center circumferential groove, respectively.

With this configuration, a grounding width on the center land can be ensured, while enabling the outer and inner center circumferential grooves to ensure drainage performance.

If the groove width of the outer shoulder circumferential groove and the groove width of the inner shoulder circumferential groove exceed 4.0 times the groove width of the outer circumferential groove and the groove width of the inner center circumferential groove, respectively, the groove cross-sectional areas of the outer and inner center circumferential grooves can be excessively small, so that it would become difficult to ensure the drainage performance.

If the groove width of the outer shoulder circumferential groove and the groove width of the inner shoulder circumferential groove are less than 1.2 times the groove width of the outer center circumferential groove and the groove width of the inner center circumferential groove, respectively, the groove widths of the outer and inner circumferential grooves can be excessively large, and cause the center land to reduce in width. Therefore, the traction effect on the center land can deteriorate, and the traction performance during the vacancy of the vehicle can be insufficient.

Each of the outer center circumferential groove and the inner center circumferential groove may have a groove width of 3.0 mm or more and 9.0 mm or less.

With this configuration, a grounding width on the center land can be ensured, while enabling the outer and inner center circumferential grooves to ensure drainage performance.

If the groove width of the outer center circumferential groove and the groove width of the inner center circumferential groove are less than 3.0 mm, the groove cross-sectional areas of the outer and inner center circumferential grooves can be excessively small, so that it would become difficult to ensure the drainage performance.

If the groove width of the outer center circumferential groove and the groove width of the inner center circumferential groove exceed 9.0 mm, the groove width of the outer center circumferential groove and the groove width of the inner center circumferential groove can be excessively large, and make the center land narrow in width. Therefore, the traction effect on the center land can deteriorate, and the traction performance during the vacancy of the vehicle to can be insufficient.

The groove width of the outer shoulder circumferential groove may be narrower than the groove width of the inner shoulder circumferential groove.

With this configuration, since the groove width of the outer shoulder circumferential groove is narrower than that of the inner shoulder circumferential groove, a larger width is ensured for the outer shoulder land, which is defined on the outer side of the outer shoulder circumferential groove in the axle direction, in the tire axis direction. Therefore, shoulder wear on the outer shoulder land can be reduced.

Furthermore, the pneumatic tire may further have on the tread:
  a plurality of inner quarter lateral grooves that are positioned spaced apart from each other in the tire circumferential direction, and that extend in the tire axis direction, between the inner shoulder circumferential groove and the inner center circumferential groove;
  a plurality of inner shoulder lateral grooves that are positioned spaced apart from each other in the tire circumferential direction, and that extend in the tire axis direction, between the inner shoulder circumferential groove and an axle-direction inner grounding end of the tread;
  an outer shoulder rib that is defined on an outer side with respect to the outer shoulder circumferential groove in the axle direction by the outer shoulder circumferential groove;
  an outer quarter rib that is defined between the outer shoulder circumferential groove and the outer center circumferential groove;
  a plurality of inner quarter blocks that are defined between the inner shoulder circumferential groove and the inner center circumferential groove, and defined in the tire circumferential direction by the plurality of inner quarter lateral grooves; and
  a plurality of inner shoulder blocks that are defined on an inner side with respect to the inner shoulder circumferential groove in the axle direction by the inner shoulder circumferential groove, and defined in the tire circumferential direction by the plurality of inner shoulder lateral grooves.

With this configuration, the block pattern is formed on the inner side of the tread with respect to the tire equator in the axle direction, and the rib pattern is formed on the outer side of the tread with respect to the tire equator in the axle direction. Therefore, in the inner area of the tread in the axle direction, the traction performance is ensured by the block pattern having the edge component extending in the tire axis direction. In addition, in the outer area of the tread in the axle direction, the rib pattern, by which higher rigidity can be ensured compared with a block pattern, resists the lateral force exerted at the time when the vehicle makes a turn, favorably, while suppressing the shoulder wear, in which the outer side of the shoulder land wears out more quickly than the inner side, when the tire is mounted on a steering wheel.

The groove width of the inner center circumferential groove may be narrower than the groove width of the outer center circumferential groove.

With this configuration, since the groove width of the inner center circumferential groove is narrower than the groove width of the outer center circumferential groove, it is possible to make the rubber volume smaller in the outer area of the center land in the axle direction, than that of the inner area in the axle direction. With this configuration, it is possible to balance out the rubber volumes between the area with a rib pattern, the rubber volume of which tends to be greater, on the outer side of the tread in the axle direction, and the area with a block pattern, the rubber volume of which tends to be less, on the inner side of the tread in the axle direction.

Each of the plurality of inner shoulder blocks may has an inner shoulder sipe extending inwardly in the axle direction from the inner shoulder circumferential groove, and terminated at a position spaced apart from the axle-direction inner grounding end.

With this configuration, the inner shoulder sipes extending in the tire axis direction can increase the traction performance of the inner shoulder blocks.

Furthermore, since the inner shoulder sipes are terminated at positions spaced apart from the axle-direction inner grounding end, the rigidity of the inner shoulder block does not become excessively low, due to the presence of the inner shoulder sipes. Therefore, shoulder wear on the inner shoulder blocks is reduced.

Furthermore, the outer quarter rib may include:
a plurality of outer quarter sipes that are positioned spaced apart from each other along the tire circumferential direction, that extend in the tire axis direction, and that connect the outer shoulder circumferential groove and the outer center circumferential groove; and
an outer quarter notch recessed inwardly in the axle direction from the outer shoulder circumferential groove, between the plurality of outer quarter sipes.

With this configuration, by the outer quarter sipes and the outer quarter notches, it is possible to increase the traction performance of the outer quarter rib. For example, even when the pneumatic tire according to the present invention is mounted on a driving wheel, the outer quarter rib can exert the traction performance, favorably.

Furthermore, the outer quarter sipes may have groove depths shallower on the center in the tire axis direction, than the groove depths at the respective ends in the tire axis direction.

With this configuration, in the plurality of outer quarter sipes, since the groove depth at the center in the tire axis direction is shallower than the groove depths on the respective ends in the tire axis direction, the ends of the outer quarter sipes are remained, even after the outer quarter rib wears out and the central part of the outer quarter sipes is disappeared. As a result, since the outer quarter rib has a complete rib pattern, the rigidity is increased, and the shoulder wear, in which the outer side of the shoulder land wears out more quickly than the inner side, is further suppressed, while ensuring the traction performance with the remaining portions at both ends of the plurality of outer quarter sipes.

Furthermore, each of the plurality of outer quarter sipes may include:
a deep groove portion having a groove depth of 60% or more and 90% or less the groove depths of the outer shoulder circumferential groove and the outer center circumferential groove; and
a shallow groove portion having a groove depth of 20% or more and 40% or less the groove depths of the outer shoulder circumferential groove and the outer center circumferential groove.

With this configuration, since each of the plurality of outer quarter sipes has the deep groove portion and the shallow groove portion, even if the outer quarter rib wears out by 20% to 40% and the shallow groove portion is disappeared, the deep groove portion is remained. Therefore, when 20% to 40% of the outer quarter rib wears out, the traction performance can be exerted, while suppressing shoulder wear, in which the outer side of the shoulder land wears out more quickly than the inner side.

Furthermore, the outer shoulder rib may include:
a plurality of first outer shoulder slits that extend from the outer shoulder circumferential groove in the tire axis direction and that are terminated inside the outer shoulder rib; and
a plurality of second outer shoulder slits that extend in the tire axis direction from an axle-direction outer grounding end of the tread and that are terminated inside the outer shoulder rib.

With this configuration, by the plurality of first outer shoulder slits and the plurality of second outer shoulder slits, it is possible to ensure the traction performance of the outer shoulder rib.

Since the plurality of first outer shoulder slits and the plurality of second outer shoulder slits are terminated inside the outer shoulder rib, the rigidity of the outer shoulder rib does not become excessively low, due to the presence of the first and second outer shoulder slits. Therefore, shoulder wear on the outer shoulder rib is reduced.

The plurality of first outer shoulder slits may have groove depths of 50% or more and 100% or less the groove depth of the outer shoulder circumferential groove.

With this configuration, since the groove depths of the plurality of first outer shoulder slits are set appropriately, the traction performance with the first outer shoulder slits can be exerted favorably over predetermined wear-out conditions.

If the groove depths of the first outer shoulder slits are smaller than 50% of the groove depth of the outer shoulder circumferential groove, the traction performance with the first outer shoulder slits cannot be exerted in the later stage of wear beyond the medium wear condition.

The plurality of second outer shoulder slits may have groove depths of 20% or more and 40% or less the groove depth of the outer shoulder circumferential groove.

With this configuration, since the plurality of second outer shoulder slits are formed on the outer edge of the outer shoulder rib in the axle direction, the outer shoulder rib being where shoulder wear is likely to occur, and the groove depths of the plurality of second outer shoulder slits are 20% or more and 40% or less the groove depth of the outer shoulder circumferential groove, the plurality of second outer shoulder slits are disappeared when the outer shoulder rib wears out by 20% to 40% of the groove depth of the outer shoulder circumferential groove. Therefore, it is possible to ensure the rigidity of the worn-out outer shoulder rib. In particular, since the rigidity on the outer side in the axle direction can be ensured, the shoulder wear on the outer edge in the axle direction is suppressed.

The lengths of the plurality of first outer shoulder slits and the plurality of second outer shoulder slits along the tire axis direction may be 20% or more and 60% or less the width of the outer shoulder rib.

According to the present configuration, since the plurality of first outer shoulder slits and the plurality of second outer shoulder slits are set appropriately, it is possible to suppress reduction in rigidity of the outer shoulder rib due to the first and second outer shoulder slits, while allowing the first and second outer shoulder slits to exert the traction performance. In this manner, shoulder wear on the shoulder land is reduced.

The pneumatic tire may further have on the tread:
a plurality of center lateral grooves that are positioned spaced apart from each other in the tire circumferential direction, and that connect the inner center circumferential groove and the outer center circumferential groove in the tire axis direction;
a plurality of inner quarter lateral grooves that are positioned spaced apart from each other in the tire circumferential direction, and that connect the inner center circumferential groove and the inner shoulder circumferential groove in the tire axis direction;
a plurality of inner shoulder lateral grooves that are positioned spaced apart from each other in the tire circumferential direction, and that connect the inner shoulder circumferential groove and an axle-direction inner grounding end of the tread, in the tire axis direction;
a plurality of center blocks that are defined between the inner center circumferential groove and the outer center circumferential groove, and defined in the tire circumferential direction by the plurality of center lateral grooves;
a plurality of inner quarter blocks that are defined between the inner center circumferential groove and the inner shoulder circumferential groove, and defined in the tire circumferential direction by the plurality of inner quarter lateral grooves;
a plurality of inner shoulder blocks that are defined on an inner side with respect to the inner shoulder circumferential groove in the axle direction by the inner shoulder circumferential groove, and defined in the tire circumferential direction by the plurality of inner shoulder lateral grooves;
a center sipe that connects the inner center circumferential groove and the outer center circumferential groove in the tire axis direction in each of the plurality of center blocks; and
an inner shoulder notch that extends inwardly, in each of the plurality of inner shoulder blocks, in the axle direction from the inner shoulder circumferential groove, and that is terminated inside the inner shoulder block,
wherein the plurality of inner quarter lateral grooves may also include:
a first quarter lateral groove that is positioned on an extension of the center lateral groove and on an extension of the inner shoulder notch; and
a second quarter lateral groove that is positioned on an extension of the center sipe and on an extension of the inner shoulder lateral groove.

With this configuration, the first quarter lateral groove is positioned on the extension of the center lateral groove and on the extension of the inner shoulder notch, and the second quarter lateral groove is positioned on the extension of the center sipe and on the extension of the inner shoulder lateral groove. As a result, a first traction element and a second element are formed alternately in the tire circumferential direction, the first traction element including the center lateral groove, the first quarter lateral groove, and the inner shoulder notch, and extending across the center block to a middle of the corresponding inner shoulder block in the tire axis direction, and the second traction element including the center sipe, the second quarter lateral groove, and the inner shoulder lateral groove, and extending across the center block to the axle-direction inner grounding end in the tire axis direction. Therefore, in the area on inner in the axle direction, the first and second traction elements extending across the center blocks to the inner shoulder blocks can exert the traction performance, favorably.

In addition, since the inner shoulder notches formed on the inner end of the first traction element in the axle direction are terminated inside the inner shoulder block, it is possible to suppress excessive reduction in the rigidity of the inner shoulder block, due to the presence of the inner shoulder notches. In addition, since the center sipes formed on the outer end of the second traction element in the axle direction are sipes, groove walls facing each other in the tire circumferential direction abut against each other and support each other, upon being brought into contact with the ground, so that it is possible to suppress excessive reduction in the rigidity of the center blocks due to the center sipes.

With the first or second quarter lateral grooves are positioned on the extensions of the center lateral grooves, respectively, and on the extensions of the inner shoulder lateral grooves, respectively, when the tire starts to rotate and kicks the road surface, the center blocks, the inner quarter blocks, and the inner shoulder blocks move very much, so that the heel-and-toe wear can become extensive.

The groove depth of the center sipe may be shallower on both ends in the tire axis direction than the groove depth at the center in the tire axis direction.

With this configuration, since the groove depth of the center sipe is shallower on the respective ends in the tire axis direction than the groove depth at the center in the tire axis direction, the center is remained even if both ends are disappeared as the center block wears out. As a result, since the center sipes are remained, the traction performance of the center block can be remained.

Each of the center sipes may include:
a deep groove portion having a groove depth of 60% or more and 90% or less the groove depth of the inner center circumferential groove and the outer center circumferential groove; and
a shallow groove portion having a groove depth of 20% or more and 40% or less the groove depth of the inner center circumferential groove and the outer center circumferential groove.

With this configuration, since each of the center sipes has the deep groove portion and the shallow groove portion, even if the center block wears out by 20% to 40% and the shallow groove portion is disappeared, the deep groove portion is remained. Therefore, traction performance can be exerted when the center blocks wear out by 20% to 40%, while suppressing shoulder wear, in which the outer side of the center land wears out more quickly than the inner side.

The pneumatic tire may further have:
an outer quarter rib that is defined between the outer shoulder circumferential groove and the outer center circumferential groove; and an outer shoulder rib that is defined on the outer side of the outer shoulder circumferential groove in the axle direction.

With this configuration, the block pattern is formed on the inner side of the tread with respect to the tire equator in the axle direction, and the rib pattern is formed on the outer side of the tread with respect to the tire equator in the axle direction. Therefore, in the inner area of the tread in the axle direction, the traction performance is ensured by the block pattern having the edge component extending in the tire axis direction. In addition, in the outer area of the tread in the axle direction, the rib pattern, by which higher rigidity can be ensured compared with a block pattern, resists the lateral force exerted at the time when the vehicle makes a turn, favorably, while suppressing the shoulder wear, in which the outer side of the shoulder land wears out more quickly than the inner side, when the tire is mounted on a steering wheel.

The pneumatic tire may further have on the tread includes:

a plurality of deep center lateral grooves and a plurality of shallow center lateral grooves that are alternately positioned spaced from each other in the tire circumferential direction, that connect the inner center circumferential groove and the outer center circumferential groove in the tire axis direction, and that have the same groove width;

a plurality of wide inner quarter lateral grooves and a plurality of narrow inner quarter lateral grooves that are positioned spaced from each other in the tire circumferential direction, and that connect the inner center circumferential groove and the inner shoulder circumferential groove in the tire axis direction; and a plurality of inner shoulder lateral grooves that are positioned spaced apart from each other in the tire circumferential direction, and that connect the inner shoulder circumferential groove and an axle-direction inner grounding end of the tread, in the tire axis direction, wherein a groove depth of each of the plurality of deep center lateral grooves is 50% or more and 100% or less groove depths of the inner center circumferential groove and the outer center circumferential groove, a groove depth of each of the plurality of shallow center lateral grooves is 5% or more and 20% or less the groove depths of the inner center circumferential groove and the outer center circumferential groove, a groove depth of each of the plurality of wide inner quarter lateral grooves is 50% or more and 100% or less the groove depth of the inner center circumferential groove, a groove depth of each of the plurality of narrow inner quarter lateral grooves is 5% or more and 20% or less the groove depth of the inner center circumferential groove, and a groove depth of each of the plurality of inner shoulder lateral grooves is 20% or more and 50% or less a groove depth of the inner shoulder circumferential groove.

With this configuration, since the tread includes the plurality of deep center lateral grooves and the plurality of shallow center lateral grooves between the inner center circumferential groove and the outer center circumferential groove, and includes the plurality of wide inner quarter lateral grooves and the plurality of narrow inner quarter lateral grooves between the inner center circumferential groove and the inner shoulder circumferential groove, traction performance can be exerted favorably in the area from the outer center circumferential groove to the inner shoulder circumferential groove.

Moreover, since the plurality of shallow center lateral grooves have groove depths shallower than the groove depth of the plurality of deep center lateral grooves, it is possible to suppress excessive reduction in the rigidity of the center blocks. In addition, since the plurality of narrow inner quarter lateral grooves have groove depths shallower than the groove depths of the plurality of wide inner quarter lateral grooves, it is possible to suppress excessive reduction in the rigidity of the plurality of inner quarter blocks, which are defined between the inner center circumferential groove and the inner shoulder circumferential groove, and are defined in the tire circumferential direction by the plurality of wide inner quarter lateral grooves and the plurality of narrow inner quarter lateral grooves.

If the groove depth of the plurality of deep center lateral grooves is less than 50% of the groove depth of the inner center circumferential groove and the outer center circumferential groove, the plurality of deep center lateral grooves can be disappeared quickly due to the wear of the center block. Therefore, the traction effect on the center land can be reduced, and the traction performance during the vacancy of the vehicle can be insufficient.

If the groove depth of the plurality of deep center lateral grooves is larger than 100% of the groove depth of the inner center circumferential groove and the outer center circumferential groove, the center block can wear out quickly due to an excessive reduction in the rigidity of the center block.

If the groove depth of the plurality of shallow center lateral grooves is less than 5% of the groove depth of the inner center circumferential groove and the outer center circumferential groove, the plurality of shallow center lateral grooves can be disappeared quickly due to the wear of the center block. Therefore, the traction effect on the center land can be reduced, and the traction performance during the vacancy of the vehicle can be insufficient.

If the groove depth of the plurality of shallow center lateral grooves is larger than 20% of the groove depth of the inner center circumferential groove and the outer center circumferential groove, the center block can wear out quickly due to an excessive reduction in the rigidity of the center block.

If the groove depth of the plurality of wide inner quarter lateral grooves is less than 50% of the groove depth of the inner center circumferential groove, the plurality of wide inner quarter lateral grooves can be disappeared quickly due to the wear of the inner quarter block. Therefore, the traction effect on the inner quarter block can be reduced.

If the groove depth of the plurality of wide inner quarter lateral grooves is larger than 100% of the groove depth of the inner center circumferential groove, the inner quarter block can wear out quickly due to an excessive reduction in the rigidity of the inner quarter block.

If the groove depth of the plurality of narrow inner quarter lateral grooves is less than 5% of the groove depth of the inner center circumferential groove, the plurality of narrow inner quarter lateral grooves can be disappeared quickly due to the wear of the inner quarter block. Therefore, the traction effect on the inner quarter block can be reduced.

When the groove depth of the plurality of narrow inner quarter lateral grooves is larger than 20% of the groove depth of the inner center circumferential groove, the inner quarter block can wear out quickly due to an excessive reduction in the rigidity of the inner quarter block.

The tread further includes a plurality of inner shoulder lateral grooves, between the inner shoulder circumferential groove and the axle-direction inner grounding end. Therefore, the plurality of inner shoulder lateral grooves can exert the traction performance favorably, between the inner shoulder circumferential groove and the axle-direction inner contact grounding end.

Moreover, since the groove depths of the plurality of inner shoulder lateral grooves are 20% or more and 50% or less the groove depth of the inner shoulder circumferential groove, it is possible to suppress excessive reduction in the rigidity of the plurality of inner shoulder blocks, which are defined between the inner shoulder circumferential groove on the inner side in the axle direction, and are defined in the tire circumferential direction by the plurality of inner shoulder lateral grooves.

If the groove depth of the plurality of inner shoulder lateral grooves is less than 20% of the groove depth of the inner shoulder circumferential groove, the plurality of inner shoulder lateral grooves can be disappeared quickly due to the wear of the inner shoulder block. Therefore, the traction effect on the inner shoulder block can be reduced.

When the groove depth of the plurality of inner shoulder lateral grooves is larger than 50% of the groove depth of the inner shoulder circumferential groove, the inner quarter block can wear out quickly due to an excessive reduction in the rigidity of the inner shoulder block.

Therefore, with the pneumatic tire according to the present invention, while enabling the center land to ensure the traction performance of the pneumatic tire during the vacancy, it is possible to suppress shoulder wear, and ensure the traction performance at the same time.

BRIEF DESCRIPTION OF DRAWINGS

The foregoing and the other features of the present invention will become apparent from the following description and drawings of an illustrative embodiment of the invention in which.

DETAILED DESCRIPTION

An embodiment of the present invention will now be explained with reference to attached drawings.

Figure 1:
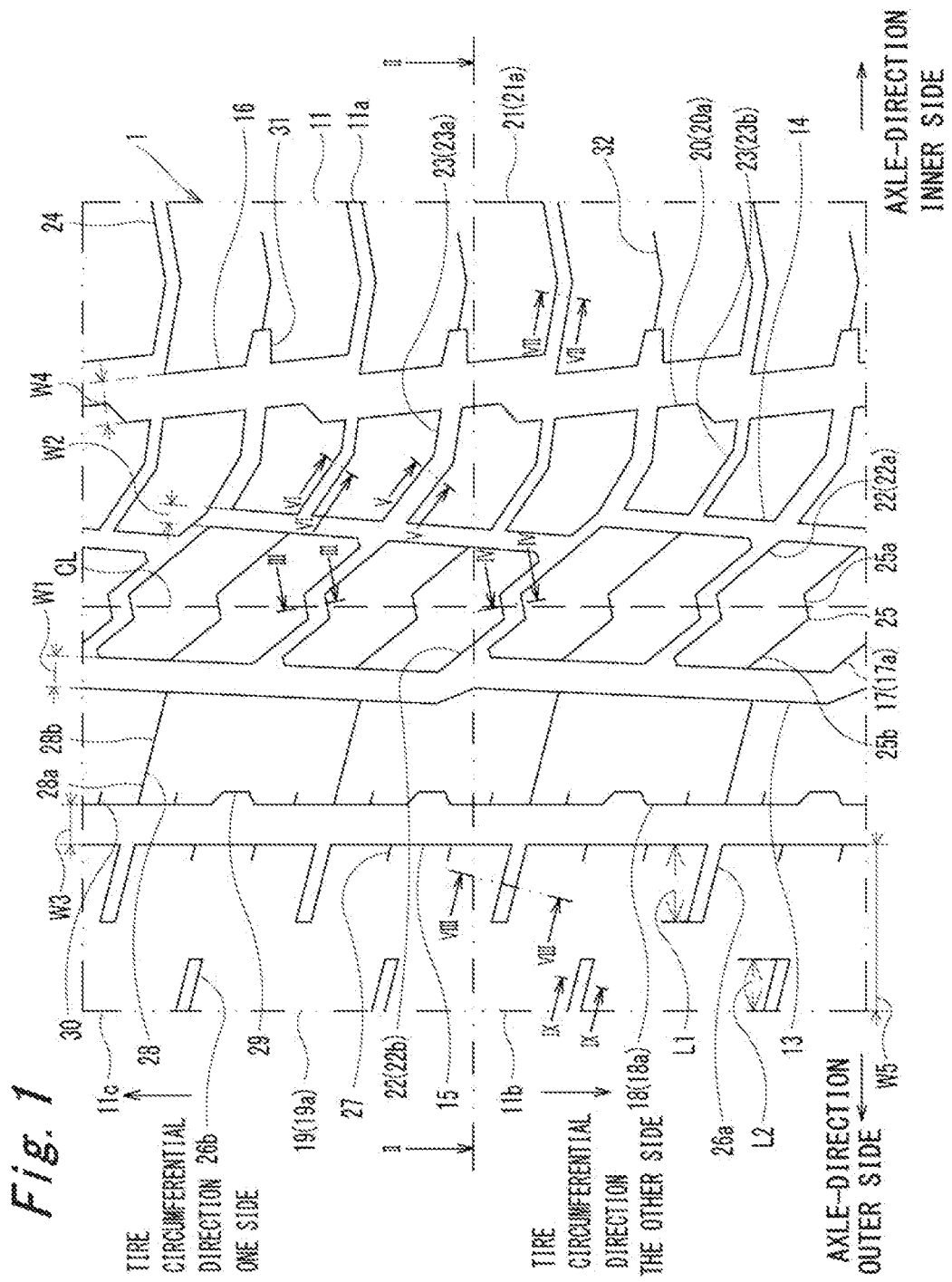
FIG. 1 is a schematic view of a tread of a pneumatic tire according to an embodiment of the present invention, as viewed from a radially outer side.

FIG. 1 is a schematic view of a tread of a pneumatic tire (hereinafter, simply referred to as a "tire") according to an embodiment of the present invention, as viewed from a radially outer side. This tire 1 according to the embodiment is configured as a rubber tire for an electric vehicle (EV) light truck or an EV truck bus. The tire for a light track is a tire stipulated in JATMA YEAR BOOK (Section B: Light Truck Tyres). In the present embodiment, the left side in FIG. 1 is referred to as an outer side in the axle direction, in the state in which the tire 1 is mounted on the vehicle (hereinafter, simply referred to as a "vehicle-mounted state"), and the right side in FIG. 1 is referred to as an inner side in the axle direction, in the state in which the tire 1 is mounted on the vehicle. The upper side in FIG. 1 is referred to as one side in the tire circumferential direction, and the lower side in FIG. 1 is referred to as the other side in the tire circumferential direction.

Tire Structure

The tire 1 includes a tread 11 extending in a tire axis direction represented in a left-right direction in FIG. 1, an axle-direction inner grounding end 11a positioned on the inner side end of the tread 11 in the axle direction, and an axle-direction outer grounding end 11b positioned on the outer side end of the tread 11 in the axle direction.

The tread 11 extends in the tire circumferential direction represented in the up-down direction in FIG. 1, in a manner extending cylindrically around the axial center of the tire 1. The tread 11 is provided on an outer end in a tire radial direction, and has a tread surface 11c that is a contact surface to be brought into contact with the ground while rolling.

The tread 11 includes: an outer center circumferential groove 13 positioned on the outer side of the tire equator CL in the axle direction, in the vehicle-mounted state, and extending in a zig-zag pattern in the tire circumferential direction; and an inner center circumferential groove 14 positioned on the inner side of the tire equator CL in the axle direction, in the vehicle-mounted state, and extending in a zig-zag pattern in the tire circumferential direction. Each of the outer center circumferential groove 13 and the inner center circumferential groove 14 is recessed inwardly from the tread surface 11c, in the tire radial direction.

In the present embodiment, the outer center circumferential groove 13 extends toward the one side from the other side in the tire circumferential direction, and is inclined toward the inner side in the axle direction. The inner center circumferential groove 14 extends toward the one side from the other side in the tire circumferential direction, and is inclined toward the inner side in the axle direction.

The tread 11 includes: an outer shoulder circumferential groove 15 positioned on the outer side of the outer center circumferential groove 13 in the axle direction, in the vehicle-mounted state, and linearly extending in the tire circumferential direction; and an inner shoulder circumferential groove 16 positioned on the inner side of the inner center circumferential groove 14 in the axle direction, in the vehicle-mounted state, and extending in a zig-zag pattern in the tire circumferential direction. Each of the outer shoulder circumferential groove 15 and the inner shoulder circumferential groove 16 is recessed inwardly from the tread surface 11c in the tire radial direction.

In the present embodiment, the inner shoulder circumferential groove 16 extends toward the one side from the other side in the tire circumferential direction, and inclined toward the outer side in the axle direction.

The outer center circumferential groove 13, the inner center circumferential groove 14, the outer shoulder circumferential groove 15, and the inner shoulder circumferential groove 16 have groove widths W1, W2, W3, and W4, respectively, in the axle direction.

The groove width W1 of the outer center circumferential groove 13 and the groove width W2 of the inner center circumferential groove 14 are narrower than the groove width W3 of the outer shoulder circumferential groove 15 and the groove width W4 of the inner shoulder circumferential groove 16, respectively. Preferably, the groove width W3 of the outer shoulder circumferential groove 15 and the groove width W4 of the inner shoulder circumferential groove 16 are 1.2 times or more and 4.0 times or less the groove width W1 of the outer center circumferential groove 13 and the groove width W2 of the inner center circumferential groove 14, respectively. More preferably, the groove width W1 of the outer center circumferential groove 13 and the groove width W2 of the inner center circumferential groove 14 are 3.0 mm or more and 9.0 mm or less, and the groove width W3 of the outer shoulder circumferential groove 15 and the groove width W4 of the inner shoulder circumferential groove 16 are 9.0 mm or more and 13.0 mm or less.

In the present embodiment, the groove width W3 of outer shoulder circumferential groove 15 is 10.8 mm. The groove width W4 of the inner shoulder circumferential groove 16 is 12.0 mm. It means that the groove width W3 of the outer shoulder circumferential groove 15 is narrower than the groove width W4 of the inner shoulder circumferential groove 16.

In the present embodiment, the groove width W2 of the inner center circumferential groove 14 is 4.7 mm. The groove width W1 of the outer center circumferential groove 13 is 7.8 mm. It means that the groove width W2 of the inner center circumferential groove 14 is narrower than the groove width W1 of the outer center circumferential groove 13.

Figure 2:
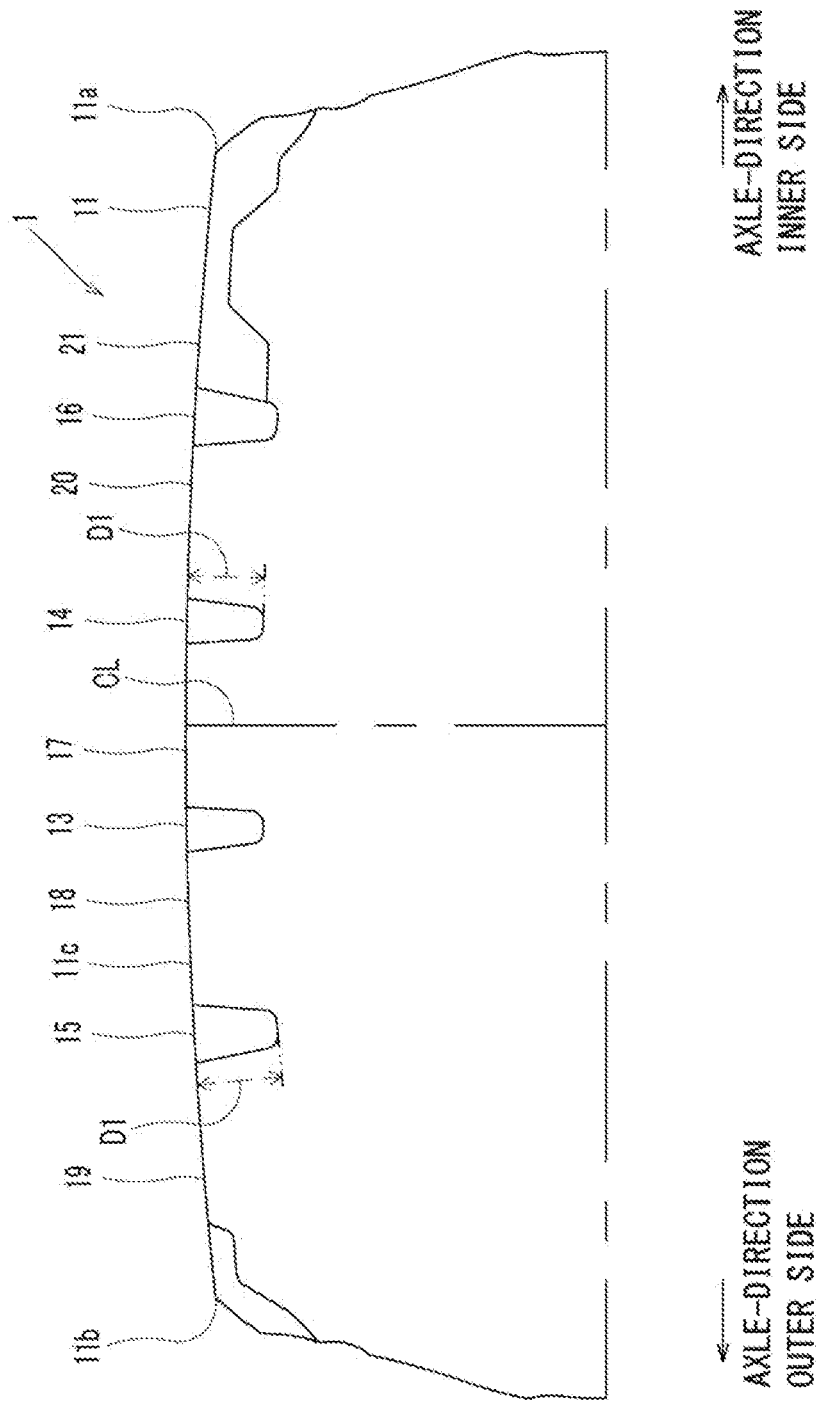
FIG. 2 is a cross-sectional view taken along line II in FIG. 1.

FIG. 2 is a cross-sectional view taken along line II in FIG. 1, illustrating a cross section of the tread 11.

In the present embodiment, the outer center circumferential groove 13, the inner center circumferential groove 14, the outer shoulder circumferential groove 15, and the inner shoulder circumferential groove 16 all have the same groove depth D1.

The tread 11 includes a center land 17 defined between the outer center circumferential groove 13 and the inner center circumferential groove 14.

The tread 11 includes an outer quarter land 18 defined between the outer center circumferential groove 13 and the outer shoulder circumferential groove 15.

The tread 11 includes an outer shoulder land 19 defined by the outer shoulder circumferential groove 15 on the outer side in the axle direction.

The tread 11 includes an inner quarter land 20 defined between the inner center circumferential groove 14 and the inner shoulder circumferential groove 16.

The tread 11 includes an inner shoulder land 21 defined by the inner shoulder circumferential groove 16, on the inner side in the axle direction.

Each of the outer shoulder land 19 and the inner shoulder land 21 is a chamfered square shoulder.

As illustrated in FIG. 1, the tread 11 includes a plurality of center lateral grooves 22 disposed spaced from each other in the tire circumferential direction, and connecting the outer center circumferential groove 13 and the inner center circumferential groove 14 in the tire axis direction. The plurality of center lateral grooves 22 include a plurality of deep center lateral grooves 22*a* and a plurality of shallow center lateral grooves 22*b* that are alternately positioned with respect to each other, in the tire circumferential direction. The plurality of deep center lateral grooves 22*a* have the same groove widths as those of the plurality of shallow center lateral grooves 22*b*, but have groove depths larger than those of the plurality of shallow center lateral grooves 22*b*.

In the present embodiment, each of the plurality of center lateral grooves 22 extends in a zig-zag pattern from the inner side toward the outer side in the axle direction, and is inclined toward the one side in the tire circumferential direction.

Figure 3:
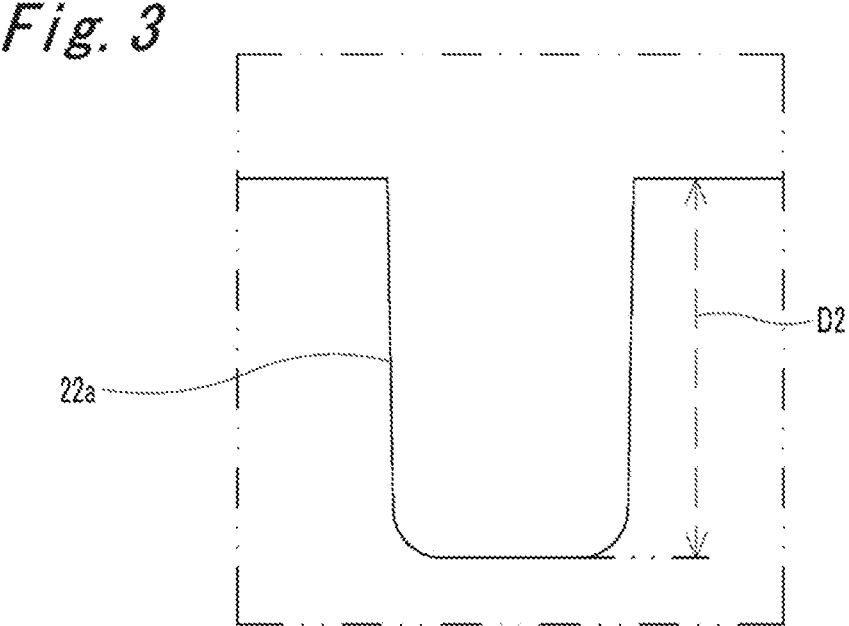
FIG. 3 is a cross-sectional view taken along line III in FIG. 1.

FIG. 3 is a cross-sectional view taken along line III in FIG. 1, and illustrates a cross section of the deep center lateral groove 22*a*. Each of the plurality of deep center lateral grooves 22*a* has a groove depth D2 that is 50% or more and 100% or less the groove depth D1 of the outer center circumferential groove 13 and the inner center circumferential groove 14.

Figure 4:
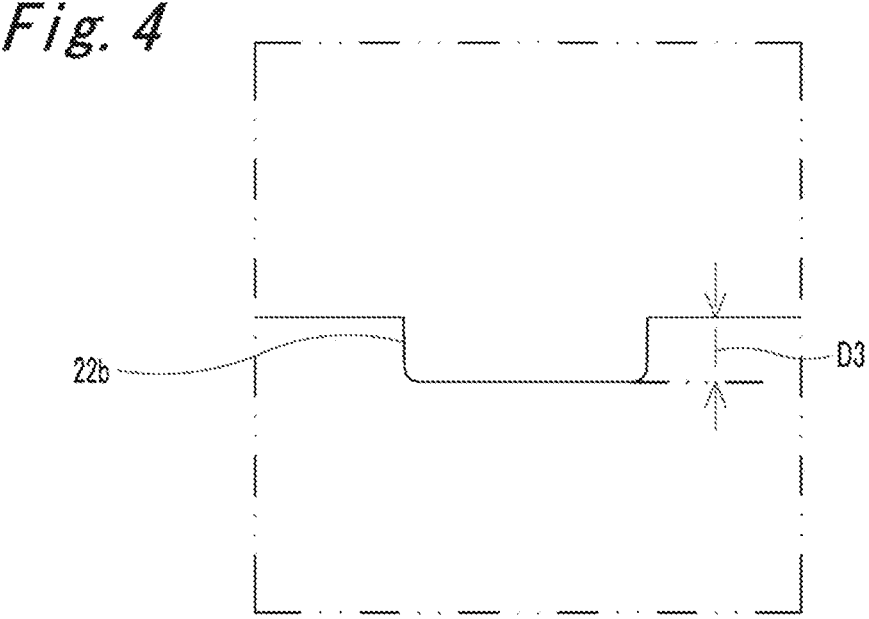
FIG. 4 is a cross-sectional view taken along line IV in FIG. 1.

FIG. 4 is a cross-sectional view taken along line IV in FIG. 1, and illustrates a cross section of the shallow center lateral groove 22*b*. Each of the plurality of shallow center lateral grooves 22*b* has a groove depth D3 that is 5% or more and 20% or less the groove depth D1 of the outer center circumferential groove 13 and the inner center circumferential groove 14.

As illustrated in FIG. 1, the tread 11 includes a plurality of inner quarter lateral grooves 23 that are positioned spaced from each other in the tire circumferential direction, and that connect the inner center circumferential groove 14 and the inner shoulder circumferential groove 16 in the tire axis direction. The plurality of inner quarter lateral grooves 23 include a plurality of wide inner quarter lateral grooves 23*a* and a plurality of narrow inner quarter lateral grooves 23*b* positioned alternately, in the tire circumferential direction. The plurality of wide inner quarter lateral grooves 23*a* have groove widths larger than the groove widths of the narrow inner quarter lateral grooves 23*b*.

In the present embodiment, each of the plurality of inner quarter lateral grooves 23 extends from the inner side toward the outer side in the axle direction, and is bent and inclined toward the one side in the tire circumferential direction.

The plurality of wide inner quarter lateral grooves 23*a* are positioned on the extensions of the plurality of center lateral grooves 22, respectively.

Figure 5:
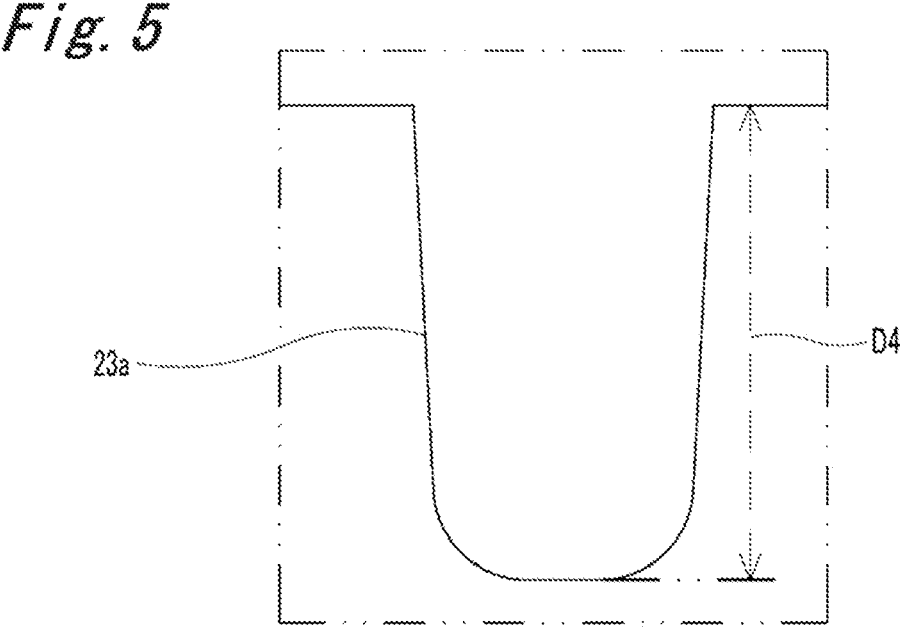
FIG. 5 is a cross-sectional view taken along line V in FIG. 1.

FIG. 5 is a cross-sectional view taken along line V in FIG. 1, and illustrates a cross section of the wide inner quarter lateral groove 23*a*. Each of the plurality of wide inner quarter lateral grooves 23*a* has a groove depth D4 that is 50% or more and 100% or less the groove depth D1 of the inner center circumferential groove 14.

Figure 6:
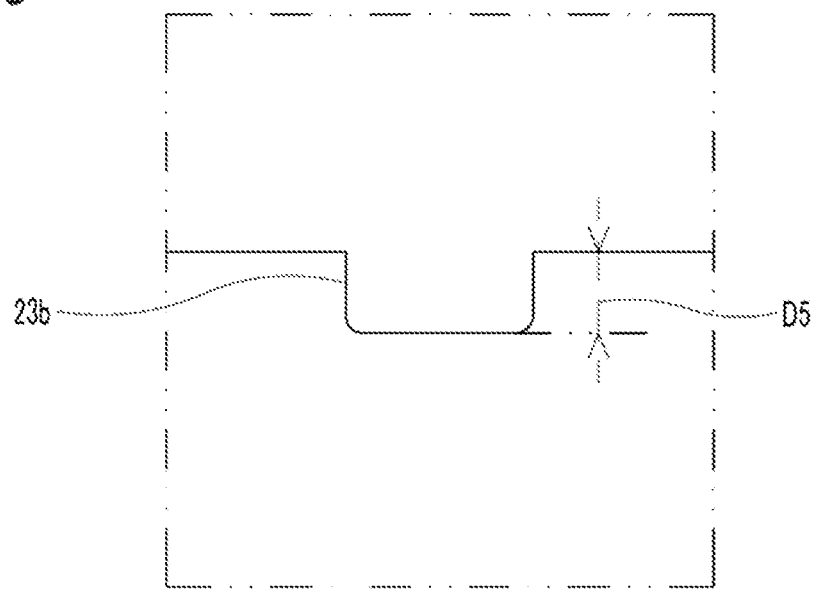
FIG. 6 is a cross-sectional view taken along line VI in FIG. 1.

FIG. 6 is a cross-sectional view taken along line VI in FIG. 1, and illustrates a cross section of the narrow inner quarter lateral groove 23*b*. Each of the plurality of narrow inner quarter lateral grooves 23*b* has a groove depth D5 that is 5% or more and 20% or less the groove depth D1 of the inner center circumferential groove 14.

As illustrated in FIG. 1, the tread 11 includes a plurality of inner shoulder lateral grooves 24 that are positioned spaced apart from each other along the tire circumferential direction, and that connect the inner shoulder circumferential groove 16 and the axle-direction inner grounding end 11*a*, in the tire axis direction.

In the present embodiment, each of the plurality of inner shoulder lateral grooves 24 extends from the inner side toward the outer side in the axle direction, and is bent in a manner protruding toward the other side in the tire circumferential direction.

The plurality of inner shoulder lateral grooves 24 are positioned on the extensions of the plurality of narrow inner quarter lateral grooves 23*b*, respectively.

Figure 7:
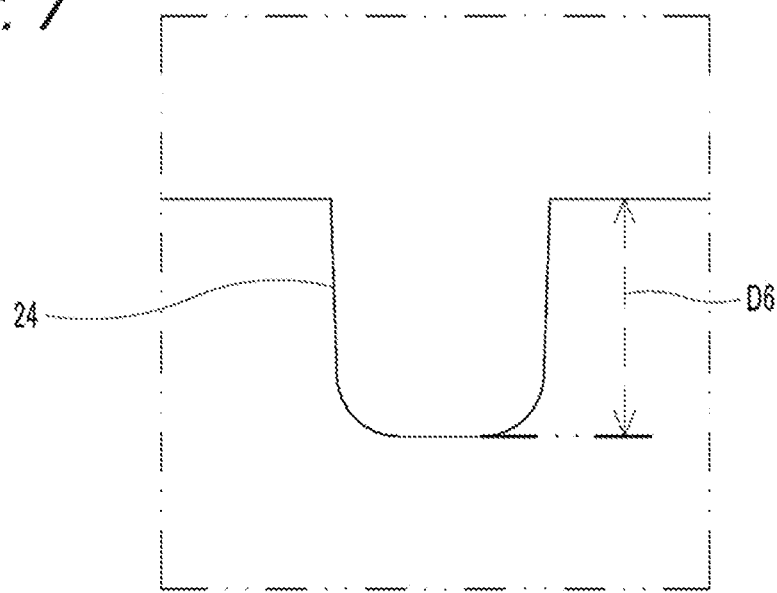
FIG. 7 is a cross-sectional view taken along line VII in FIG. 1.

FIG. 7 is a cross-sectional view taken along line VII in FIG. 1, and illustrates a cross section of the inner shoulder lateral groove 24. Each of the plurality of inner shoulder lateral grooves 24 has a groove depth D6 that is 20% or more and 50% or less the groove depth D1 of the inner shoulder circumferential groove 16.

As illustrated in FIG. 1, the tread 11 includes a plurality of center blocks 17a that are defined between the outer center circumferential groove 13 and the inner center circumferential groove 14 and defined by the plurality of center lateral grooves 22.

In each of the center blocks 17a, since the groove width W2 of the inner center circumferential groove 14 is narrower than the groove width W1 of the outer center circumferential groove 13, the volume of the rubber in the area on the outer side with respect to the tire equator CL in the axle direction is less than that in the area on the inner side with respect to the tire equator CL in the axle direction. Therefore, the center of gravity of each of the center blocks 17a is positioned on the inner side with respect to the tire equator CL in the axle direction.

The tread 11 includes an outer quarter rib 18a defined between the outer shoulder circumferential groove 15 and the outer center circumferential groove 13.

The tread 11 includes an outer shoulder rib 19a defined by the outer shoulder circumferential groove 15, on the outer side in the axle direction.

The tread 11 includes inner quarter blocks 20a defined between the inner shoulder circumferential groove 16 and the inner center circumferential groove 14, and defined in the tire circumferential direction by the plurality of inner quarter lateral grooves 23.

The tread 11 includes inner shoulder blocks 21a defined on the inner side in the axle direction by the inner shoulder circumferential groove 16, and defined in the tire circumferential direction by the plurality of inner shoulder lateral grooves 24.

Each of the center blocks 17a has a center sipe 25 connecting the outer center circumferential groove 13 and the inner center circumferential groove 14 in the tire axis direction.

In the present embodiment, each of the center sipes 25 extends in a zig-zag pattern from the inner side toward the outer side in the axle direction, and is inclined toward the one side in the tire circumferential direction.

The center sipes 25 are positioned on the extensions of the plurality of narrow inner quarter lateral grooves 23b, respectively.

Preferably, the center sipes 25 have depths shallower on the respective ends in the tire axis direction, than the depth in the center in the tire axis direction. More preferably, the center sipe 25 includes a center sipe deep groove portion 25a having a groove depth of 60% or more and 90% or less the groove depth D1 of the outer center circumferential groove 13 and the inner center circumferential groove 14 at the center in the tire axis direction, and a center sipe shallow groove portion 25b having a groove depth of 20% or more and 40% or less the groove depth D1 of the outer center circumferential groove 13 and the inner center circumferential groove 14, on the respective ends in the tire axis direction.

In this embodiment, the outer shoulder rib 19a includes a plurality of first outer shoulder slits 26a extending from the outer shoulder circumferential groove 15 in the tire axis direction, and terminated inside the outer shoulder rib 19a, and a plurality of second outer shoulder slits 26b extending from the axle-direction outer grounding end 11b, in the tire axis direction, and terminated inside the outer shoulder rib 19a.

In the present embodiment, each of the plurality of first outer shoulder slits 26a and the plurality of second outer shoulder slits 26b extends linearly from the inner side toward the outer side in the axle direction, and are inclined toward the one side in the tire circumferential direction.

Figure 8:
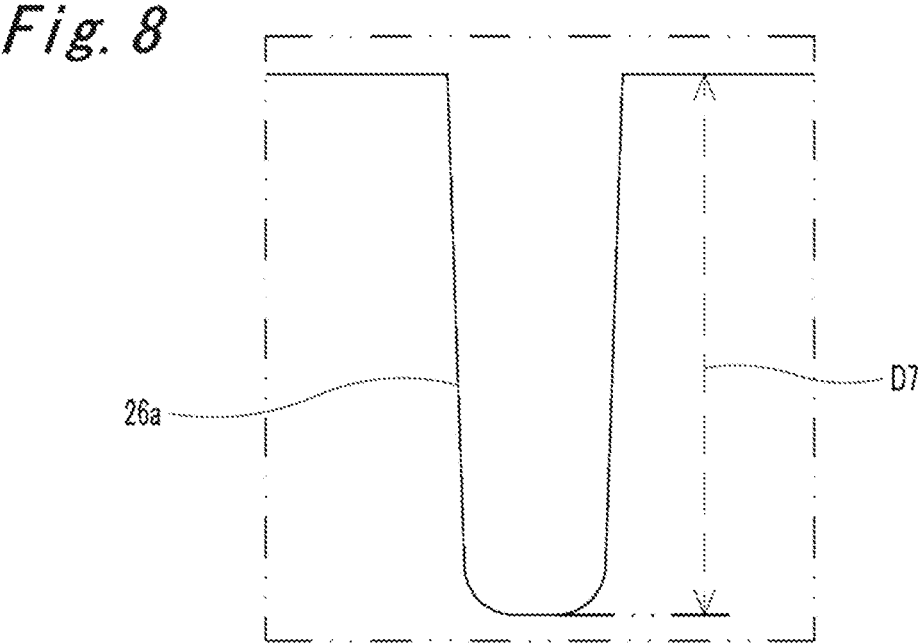
FIG. 8 is a cross-sectional view taken along line VIII in FIG. 1.

FIG. 8 is a cross-sectional view taken along line VIII in FIG. 1, and illustrates a cross section of the first outer shoulder slit 26 a. The plurality of first outer shoulder slits 26a have groove depths D7 that is 50% or more and 100% or less the groove depth D1 of the outer shoulder circumferential groove 15.

Figure 9:
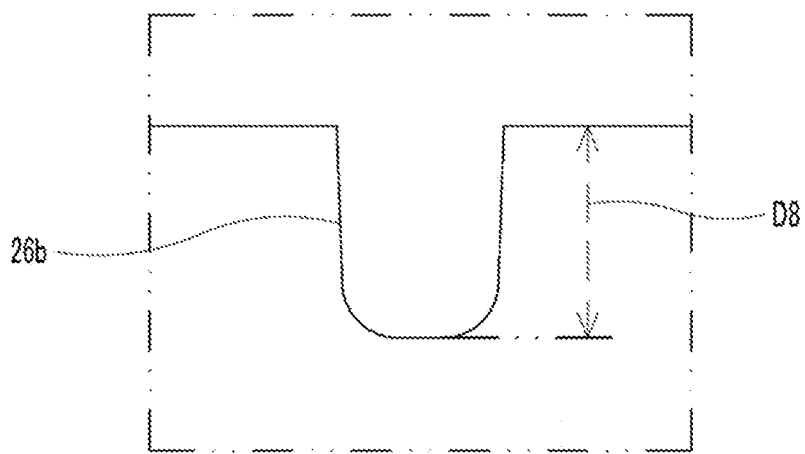
FIG. 9 is a cross-sectional view taken along line IX in FIG. 1.

FIG. 9 is a cross-sectional view taken along line IX in FIG. 1, and illustrates a cross section of the second outer shoulder slit 26b. The plurality of second outer shoulder slits 26b have groove depths D8 that is 20% or more and 40% or less the groove depth D1 of the outer shoulder circumferential groove 15.

As illustrated in FIG. 1, the lengths L1 of the plurality of first outer shoulder slits 26a and the lengths L2 of the plurality of second outer shoulder slits 26b along the tire axis direction are both 20% or more and 60% or less the width W5 of the outer shoulder rib 19a.

In the present embodiment, the outer shoulder rib 19a includes a plurality of outer shoulder rib edge sipes 27 each extending from the outer shoulder circumferential groove 15 in the tire axis direction, between the plurality of first outer shoulder slits 26a, and terminated inside the outer shoulder rib 19a.

Each of the plurality of outer shoulder rib edge sipes 27 extends linearly from the inner side toward the outer side in the axle direction, and is inclined toward the one side in the tire circumferential direction.

The lengths of the plurality of outer shoulder rib edge sipes 27 in the tire axis direction are shorter than the length L1 of the plurality of first outer shoulder slits 26a in the tire axis direction.

The groove depths of the plurality of outer shoulder rib edge sipes 27 are shallower than the groove depth D1 of the outer shoulder circumferential groove 15.

In the present embodiment, the outer quarter rib 18a has a plurality of outer quarter sipes 28 that are positioned spaced from each other in the tire circumferential direction, that extend in the tire axis direction, and that connect the outer shoulder circumferential groove 15 and the outer center circumferential groove 13.

Each of the plurality of outer quarter sipes 28 extends linearly from the inner side toward the outer side in the axle direction, and is inclined toward the one side in the tire circumferential direction.

The plurality of outer quarter sipes 28 are positioned on the extensions of the plurality of first outer shoulder slits 26a, respectively.

Preferably, each of the plurality of outer quarter sipes 28 has a depth shallower on the center in the tire axis direction, than the depth in the respective ends in the tire axis direction. More preferably, each of the plurality of outer quarter sipes 28 has outer quarter sipe deep groove portions 28a having groove depths of 60% or more and 90% or less the groove depths D1 of the outer shoulder circumferential groove 15 and of the outer center circumferential groove 13, at the respective ends in the tire axis direction, and an outer quarter sipe shallow groove portion 28b having a groove depth of 20% or more and 40% or less the groove depths D1 of the outer shoulder circumferential groove 15 and of the outer center circumferential groove 13, in the center in the tire axis direction.

In the present embodiment, the outer quarter rib 18a has outer quarter notches 29 recessed inwardly in the axle direction from the outer shoulder circumferential groove 15, each of the outer quarter notches 29 being provided between a pair of the plurality of outer quarter sipes 28.

In the present embodiment, the outer quarter rib 18a has a plurality of outer quarter rib edge sipes 30 extending from the outer shoulder circumferential groove 15 in the tire axis direction and terminated inside the outer quarter rib 18a. Each of the outer quarter rib edge sipes 30 is provided between one of the plurality of outer quarter sipes 28 and one of the outer quarter notches 29.

Each of the plurality of outer quarter rib edge sipes 30 extends linearly from the outer side toward the inner side in the axle direction, and is inclined toward the other side in the tire circumferential direction.

The lengths of the plurality of outer quarter rib edge sipes 30 in the tire axis direction are shorter than the lengths of the plurality of outer quarter sipes 28 in the tire axis direction.

The groove depths of the plurality of outer quarter rib edge sipes 30 are shallower than the groove depth D1 of the outer shoulder circumferential groove 15.

Each of the plurality of inner shoulder blocks 21a includes inner shoulder notches 31 recessed inwardly in the axle direction from the inner shoulder circumferential groove 16, and inner shoulder sipes 32 extending from the inner shoulder notches 31, respectively, in the tire axis direction, and terminated inside the respective inner shoulder blocks 21a.

In the present embodiment, each of the inner shoulder sipes 32 extends from the outer side toward the inner side in the axle direction, and is bent in a manner protruding toward the other side in the tire circumferential direction.

The inner shoulder notches 31 are positioned on the extensions of the plurality of wide inner quarter lateral grooves 23a, respectively.

Operations and Effects

The tire 1 configured as described above has the following characteristics.

Since the groove width W1 of the outer center circumferential groove 13 and the groove width W2 of the inner center circumferential groove 14 are narrower than the groove width W3 of the outer shoulder circumferential groove 15 and the groove width W4 of the inner shoulder circumferential groove 16, respectively, larger widths can be ensured, in the tire axis direction, for the center land 17 defined between the outer and inner center circumferential grooves 13 and 14, the outer quarter land 18 defined between the outer center circumferential groove 13 and the outer shoulder circumferential groove 15, and the inner quarter land 20 defined between the inner center circumferential groove 14 and the inner shoulder circumferential groove 16, as compared with a configuration in which where the groove widths W1 and W2 are equal to or wider than the groove width W3 and the groove width W4 of the outer and inner shoulder circumferential grooves 13 and 14, respectively. When the pneumatic tire 1 according to the present invention is mounted on a vehicle such as a truck, and the truck is vacant, the grounding load tends to concentrate on the center land 17. Therefore, according to the present invention, by ensuring a larger width for the center land 17, where the grounding load is more likely to concentrate on vacant vehicles, in the tire axis direction, it is possible to ensure the traction performance during the vacancy of the vehicle.

Furthermore, since the outer shoulder circumferential groove 15 extends linearly, the outer shoulder land 19 defined by the outer shoulder circumferential groove 15, on the outer side in the axle direction, also extends linearly along the tire circumferential direction. As a result, the outer shoulder land 19 has no any edge component extending in the tire axis direction. Therefore, the rigidity of the outer shoulder land 19 in the tire circumferential direction can be increased uniformly, as compared with a configuration in which the outer shoulder circumferential groove 15 extends in a zig-zag pattern in the tire circumferential direction. When the pneumatic tire 1 according to the present invention is mounted on a steering wheel, such as a front wheel, the outer shoulder land 19 is more likely to be subjected to greater lateral force in the axle direction, as the front wheels are steered. According to the present invention, since the rigidity of the outer shoulder land 19 can be increased uniformly along the tire circumferential direction, shoulder wear, in which the outer side of the outer shoulder land 19 wears out more quickly than the inner side, is suppressed.

Furthermore, since the inner shoulder circumferential groove 16 extends in a zig-zag pattern, the inner shoulder land 21, which is defined by the inner shoulder circumferential groove 16 on the inner side in the axle direction, extends in a zig-zag pattern along the tire circumferential direction. As a result, the inner shoulder land 21 has an edge component extending in the tire axis direction, and this edge component serves as a traction element.

Therefore, with the pneumatic tire 1 according to the present invention, while enabling the center land 17 to ensure the traction performance of the pneumatic tire during the vacancy of the vehicle, it is possible to suppress the shoulder wear, in which the outer end of the outer shoulder land wears out more quickly than the inner end, and ensure the traction performance at the same time.

Since the groove width W3 of the outer shoulder circumferential groove 15 and the groove width W4 of the inner shoulder circumferential groove 16 are 1.2 times or more and 4.0 times or less the groove width W1 of the outer center circumferential groove 13 and the groove width W2 of the inner center circumferential groove 14, respectively, a grounding width on the center land 17 can be ensured, while enabling the outer and inner center circumferential grooves 13, 14 to ensure drainage performance.

If the groove width W3 of the outer shoulder circumferential groove 15 and the groove width W4 of the inner shoulder circumferential groove 16 are larger than 4.0 times the groove width W1 of the outer center circumferential groove 13 and the groove width W2 of the inner center circumferential groove 14, respectively, the groove cross-sectional areas of the outer center circumferential groove 13 and the inner center circumferential groove 14 can be excessively small, so that it would become difficult to ensure the drainage performance.

If the groove width W3 of the outer shoulder circumferential groove 15 and the groove width W4 of the inner shoulder circumferential groove 16 are less than 1.2 times the groove width W1 of the outer center circumferential groove 13 and the groove width W2 of the inner center circumferential groove 14, respectively, the groove widths W1, W2 of the outer and inner center circumferential groove 13, 14 can be excessively large, and make the center land 17 narrow in width. Therefore, the traction effect on the center land 17 can be reduced, and the traction performance during the vacancy of the vehicle can be insufficient.

Since the groove width W1 of the outer center circumferential groove 13 and the groove width W2 of the inner center circumferential groove 14 are both 3.0 mm or more and 9.0 mm or less, a grounding width on the center land 17 can be ensured, while enabling the outer and inner center circumferential grooves 13, 14 to ensure drainage performance.

If the groove width W1 of the outer center circumferential groove 13 and the groove width W2 of the inner center circumferential groove 14 are both smaller than 3.0 mm, the groove cross-sectional areas of the outer center circumferential groove 13 and the inner center circumferential groove 14 can be excessively small, so that it would become difficult to ensure the drainage performance.

When the groove width W1 of the outer center circumferential groove 13 and the groove width W2 of the inner center circumferential groove 14 are both more than 9.0 mm, the groove width W1 of the outer center circumferential groove 13 and the groove width W2 of the inner center circumferential groove 14 can be excessively large, and make the center land 17 narrow in width. Therefore, the traction effect on the center land 17 can be reduced, and the traction performance during the vacancy of the vehicle can be insufficient.

Since the groove width W3 of the outer shoulder circumferential groove 15 is narrower than the groove width W4 of the inner shoulder circumferential groove 16, a larger width in the tire axis direction can be ensured for the outer shoulder land 19 defined by the outer shoulder circumferential groove 15, on the outer side in the axle direction. Therefore, shoulder wear on the outer shoulder land 19 can be suppressed.

The tread 11 includes a block pattern on the inner side of the tread 11 with respect to the tire equator CL in the axle direction, and includes a rib pattern on the outer side with respect to the tire equator CL in the axle direction. Therefore, in the inner area of the tread 11 in the axle direction, the traction performance is ensured by the block pattern having the edge component extending in the tire axis direction. In addition, in the outer area of the tread 11 in the axle direction, the rib pattern, by which higher rigidity can be ensured compared with a block pattern, resists the lateral force exerted at the time when the vehicle makes a turn, favorably, while suppressing the shoulder wear, in which the outer side of the shoulder land wears out more quickly than the inner side, when the tire is mounted on a steering wheel.

Since the groove width W2 of the inner center circumferential groove 14 is narrower than the groove width W1 of the outer center circumferential groove 13, it is possible to make the rubber volume in the outer area of the center land 17 in the axle direction smaller than that of the inner area in the axle direction. With this configuration, it is possible to balance out the rubber volumes between the area with a rib pattern, the rubber volume of which tends to be greater, on the outer side of the tread in the axle direction 11, and the area with a block pattern, the rubber volume of which tends to be less, on the inner side of the tread 11 in the axle direction.

The inner shoulder sipes 32 extending in the tire axis direction can increase the traction performance of the inner shoulder blocks 21a.

Furthermore, since the inner shoulder sipes 32 are terminated at positions spaced apart from the axle-direction inner grounding end 11a, the rigidity of the inner shoulder block 21a is not reduced excessively by the presence of the inner shoulder sipes 32, so that it is possible to suppress shoulder wear on the inner shoulder blocks 21a.

With the outer quarter sipes 28 and the outer quarter notches 29, it is possible to increase the traction performance of the outer quarter rib 18a. For example, even when the pneumatic tire according to the present invention is mounted on a driving wheel, the outer quarter rib 18a can exert the traction performance, favorably.

Each of the plurality of outer quarter sipes 28 has a groove depth shallower at the center in the tire axis direction (the outer quarter sipe shallow groove portion 28b), than on the respective ends in the tire axis direction (the outer quarter sipe deep groove portions 28a), so that the ends of the outer quarter sipes 28 are remained, even when the outer quarter rib 18a wears out and the central part of the outer quarter sipes 28 are disappeared. As a result, since the outer quarter rib 18a is configured as a complete rib pattern, the rigidity is increased, and the shoulder wear, in which the outer side of the shoulder land wears out more quickly than the inner side, is further suppressed, while ensuring the traction performance with the remaining portions at the respective ends of the plurality of outer quarter sipes 28.

Since each of the plurality of outer quarter sipes 28 includes the outer quarter sipe deep groove portion 28a and the outer quarter sipe shallow groove portion 28b, even if the outer quarter rib 18a wears out by 20% to 40% and the outer quarter sipe shallow groove portions 28b are disappeared, the outer quarter sipe deep groove portions 28a are remained. Therefore, when 20% to 40% of the outer quarter rib 18a wears out, the traction performance can be exerted, while suppressing shoulder wear, in which the outer side of the outer quarter rib 18a wears out more quickly than the inner side.

With the plurality of first outer shoulder slits 26a and the plurality of second outer shoulder slits 26b, it is possible to ensure the traction performance of the outer shoulder rib 19a.

Since the plurality of first outer shoulder slits 26a and the plurality of second outer shoulder slits 26b are terminated inside the outer shoulder rib 19a, the rigidity of the outer shoulder rib 19a is not reduced excessively by the presence of the first and second outer shoulder slits 26a and 26b. Therefore, shoulder wear on the outer shoulder rib 19a is suppressed.

Since the groove depths D7 of the plurality of first outer shoulder slits 26a are set appropriately, the traction performance can be exerted favorably, with the first outer shoulder slits 26a, over predetermined wear-out conditions.

If the groove depths D7 of the first outer shoulder slits 26a are less than 50% of the groove depth D1 of the outer shoulder circumferential groove 15, the traction performance with the first outer shoulder slits 26a cannot be exerted in the later stage of wear beyond the medium wear condition.

Since the groove depths D8 of the plurality of second outer shoulder slits 26b are set 20% or more and 40% or less the groove depth D1 of the outer shoulder circumferential groove 15 at the outer edge of the outer shoulder rib 19a in the axle direction, where it is likely to take place the shoulder wear, the plurality of second outer shoulder slits 26b are disappeared when the outer shoulder rib 19a wears out by 20% to 40% of the groove depth D1 of the outer shoulder circumferential groove 15. Therefore, it is possible to ensure the rigidity of the outer shoulder rib 19a having worn out. In particular, since the rigidity on the outer side in the axle direction is ensured, the shoulder wear on the outer edge in the axle direction is suppressed.

Since the length L1 of the plurality of first outer shoulder slits 26a and the length L2 of the plurality of second outer shoulder slits 26b in the tire axis direction are set appropriately, it is possible to suppress excessive reduction in the rigidity of the outer shoulder rib 19a, due to the presence of the first and second outer shoulder slits 26a, 26b, while allowing the first and second outer shoulder slits 26a, 26b to exert the traction performance. In this manner, shoulder wear is suppressed.

The wide inner quarter lateral grooves 23a are positioned on the extensions of the center lateral grooves 22, respectively, and on the extensions of the inner shoulder notches 31, respectively, and the narrow inner quarter lateral grooves 23b are positioned on the extensions of the center sipes 25, respectively, and on the extensions of the inner shoulder lateral grooves 24, respectively. As a result, the first traction element and the second traction element are formed alternately along the tire circumferential direction. The first traction element herein includes the center lateral grooves 22, the wide inner quarter lateral grooves 23a, and the inner shoulder notches 31, and extends across the center blocks 17a to a middle of the inner shoulder blocks 21a in the tire axis direction. The second traction element includes the center sipes 25, the narrow inner quarter lateral grooves 23b, and the inner shoulder lateral grooves 24, and extends across the center blocks 17a to the axle-direction inner grounding end 11a in the tire axis direction. Therefore, in the area on inner side in the axle direction, the first and second traction elements extending across the center blocks 17a to the inner shoulder blocks 21a can exert the traction performance, favorably.

Moreover, since the inner shoulder notches 31 formed on an inner end of the first traction element in the axle direction are terminated inside the inner shoulder block 21a, it is possible to suppress excessive reduction in the rigidity of the inner shoulder blocks 21a, due to the presence of the inner shoulder notches 31. In addition, since the center sipes 25 formed on an outer end of the second traction element in the axle direction are sipes, groove walls facing each other in the tire circumferential direction abut against each other and support each other, upon being brought into contact with the ground, so that it is possible to suppress excessive reduction in the rigidity of the center blocks 17a, due to the presence of the center sipes 25.

In case where the wide inner quarter lateral grooves 23a or the narrow inner quarter lateral grooves 23b is positioned on the extensions of the center lateral grooves 22, respectively, and on the extensions of the inner shoulder lateral grooves 24, respectively, when the tire starts to rotate and kicks the road surface, the center blocks 17a, the inner quarter block 20a, and the inner shoulder blocks 21a move a lot, so that the heel-and-toe wear can become extensive.

The groove depth of each of the center sipes 25 is shallower on the respective ends (the center sipe shallow groove portion 25b) in the tire axis direction than the groove depth at the center (the center sipe deep groove portion 25a) in the tire axis direction. Therefore, even if the ends are disappeared as the center blocks 17a wear out, the center is remained. As a result, since the center sipes 25 are remained, the traction performance of the center blocks 17a can be remained.

Since each of the center sipes 25 has the center sipe deep groove portion 25a and the center sipe shallow groove portion 25b, even if the center block 17a wears out by 20% to 40% and the center sipe shallow groove portion 25b is disappeared, the center sipe deep groove portion 25a is remained. Therefore, when the center block 17a wears out by 20% to 40%, traction performance can be exerted, while suppressing shoulder wear, in which the outer side of the center land wears out more quickly than the inner side.

The tread 11 includes a block pattern on the inner side of the tread 11 with respect to the tire equator CL in the axle direction, and includes a rib pattern on the outer side with respect to the tire equator CL in the axle direction. Therefore, in the inner area of the tread 11 in the axle direction, the traction performance is ensured by the block pattern having the edge component extending in the tire axis direction. In addition, in the outer area of the tread 11 in the axle direction, the rib pattern, by which higher rigidity can be ensured compared with a block pattern, resists the lateral force exerted at the time when the vehicle makes a turn, favorably, while suppressing the shoulder wear, in which the outer side of the shoulder land wears out more quickly than the inner side, when the tire is mounted on a steering wheel.

The tread 11 includes the plurality of deep center lateral grooves 22a and the plurality of shallow center lateral grooves 22b between the outer and inner center circumferential grooves 13, 14, and the plurality of wide inner quarter lateral grooves 23a and the plurality of narrow inner quarter lateral grooves 23b between the inner center circumferential groove 14 and the inner shoulder circumferential groove 16. Therefore, traction performance can be exerted favorably in the area from the outer center circumferential groove 13 to the inner shoulder circumferential groove 16.

Moreover, since the plurality of shallow center lateral grooves 22b have groove depths D3 shallower than the groove depth D2 of the plurality of deep center lateral grooves 22a, it is possible to suppress excessive reduction in the rigidity of the center blocks 17a. In addition, since the groove depths D5 of the plurality of narrow inner quarter lateral grooves 23b are shallower than the groove depths D4 of the plurality of wide inner quarter lateral grooves 23a, it is possible to suppress excessive reduction in the rigidity of the plurality of inner quarter blocks 20a, which are defined between the inner center circumferential groove 14 and the inner shoulder circumferential groove 16, and are defined in the tire circumferential direction by the plurality of wide inner quarter lateral grooves 23a and the plurality of narrow inner quarter lateral grooves 23b.

If the groove depth D2 of the plurality of deep center lateral grooves 22a is less than 50% of the groove depth D1 of the inner center circumferential groove 14 and the outer center circumferential groove 13, the plurality of deep center lateral grooves 17a can be disappeared quickly due to the wear of the center block 22a. Therefore, the traction effect on the center block 17a can be reduced, and the traction performance during the vacancy of the vehicle can be insufficient.

If the groove depth D2 of the plurality of deep center lateral grooves 22a is larger than 100% of the groove depth D1 of the inner center circumferential groove 14 and the outer center circumferential groove 13, the center block 17a can wear out quickly due to an excessive reduction in the rigidity of the center block 17a.

If the groove depth D3 of the plurality of shallow center lateral grooves 22b is less than 5% of the groove depth D1 of the inner center circumferential groove 14 and the outer center circumferential groove 13, the plurality of shallow center lateral grooves 22b can be disappeared quickly due to the wear of the center block 17a. Therefore, the traction effect on the center block 17a can be reduced, and the traction performance during the vacancy of the vehicle can be insufficient.

If the groove depths D3 of the plurality of shallow center lateral grooves 22b are larger than 20% of the groove depths D1 of the inner center circumferential groove 14 and the outer center circumferential groove 13, the center block 17a can wear out quickly due to an excessive reduction in the rigidity of the center block 17a.

If the groove depths D4 of the plurality of wide inner quarter lateral grooves 23a are less than 50% of the groove depth D1 of the inner center circumferential groove 14, the plurality of wide inner quarter lateral grooves 23a can be disappeared quickly due to the wear of the inner quarter block 20a, so that the traction effect on the inner quarter block 20a can be reduced.

If the groove depths D4 of the plurality of wide inner quarter lateral grooves 23a are larger than 100% of the groove depth D1 of the inner center circumferential groove 14, the inner quarter block 20a can wear out quickly due to an excessive reduction in the rigidity of the inner quarter block 20a.

If the groove depths D5 of the plurality of narrow inner quarter lateral grooves 23b are less than 5% of the groove depth D1 of the inner center circumferential groove 14, the plurality of narrow inner quarter lateral grooves 23b can be disappeared quickly due to the wear of the inner quarter block 20a, so that the traction effect on the inner quarter block 20a can be reduced.

If the groove depths D5 of the plurality of narrow inner quarter lateral grooves 23b are larger than 20% of the groove depth D1 of the inner center circumferential groove 14, the inner quarter block 20a can wear out quickly due to an excessive reduction in the rigidity of the inner quarter block 20a.

The tread 11 further includes the plurality of inner shoulder lateral grooves 24 between the inner shoulder circumferential groove 16 and the axle-direction inner grounding end 11a. Therefore, the plurality of inner shoulder lateral grooves 24 between the inner shoulder circumferential groove 16 and the axle-direction inner grounding end 11a can exert the traction performance, favorably.

Moreover, since the groove depth D6 of the plurality of inner shoulder lateral grooves 24 is 20% or more and 50% or less the groove depth D1 of the inner shoulder circumferential groove 16, it is possible to suppress excessive reduction in the rigidity of the plurality of inner shoulder blocks 21a, which are defined by the inner shoulder circumferential groove 16, on the inner side in the axle direction, and are defined in the tire circumferential direction by the plurality of inner shoulder lateral grooves 24.

If the groove depths D6 of the plurality of inner shoulder lateral grooves 24 are less than 20% of the groove depth D1 of the inner shoulder circumferential groove 16, the plurality of inner shoulder lateral grooves 24 can be disappeared quickly due to wear of the inner shoulder block 21a, so that the traction effect on the inner shoulder block 21a can be reduced.

If the groove depths D6 of the plurality of inner shoulder lateral grooves 24 are larger than 50% of the groove depth D1 of the inner shoulder circumferential groove 16, the inner shoulder block 21a can wear out quickly due to an excessive reduction in the rigidity of the inner shoulder block 21a.

Other Embodiments

Note that the present invention is not limited to the configuration according to the embodiment described above, and various modifications are still possible.

In the embodiment described above, the tread 11 has a rib pattern on the outer side with respect to the tire equator CL in the axle direction, and has a block pattern on the inner side with respect to the tire equator CL in the axle direction, but the entire surface of the tread 11 may have a block pattern.

In the embodiment described above, the outer center circumferential groove 13, the inner center circumferential groove 14, the outer shoulder circumferential groove 15, and the inner shoulder circumferential groove 16 all have the same groove depth D1, but may have different groove depths.

In the embodiment described above, the tire 1 is configured as a rubber tire for an EV light truck or an EV truck bus, but may be configured as a rubber tire for an engine driven light truck, an engine driven truck bus, or a heavy load. The tire for heavy load is a tire stipulated in JATMA YEAR BOOK (Section C: Truck and Bus Tyres, Section D: Off-the-Road Tyres).

A first aspect of the present invention provides a pneumatic tire having on a tread:
    an outer center circumferential groove that is positioned on an outer side with respect to a tire equator in an axle direction in a vehicle-mounted state, and that extends in a tire circumferential direction;
    an inner center circumferential groove that is positioned on an inner side with respect to the tire equator in the axle direction in the vehicle-mounted state, and that extends in the tire circumferential direction;
    an outer shoulder circumferential groove that is positioned on an outer side with respect to the outer center circumferential groove in the axle direction in the vehicle-mounted state, and that linearly extends in the tire circumferential direction; and
    an inner shoulder circumferential groove that is positioned on an inner side with respect to the inner center circumferential groove in the axle direction in the vehicle-mounted state, and that extends in a zig-zag pattern in the tire circumferential direction,
    wherein the outer center circumferential groove and the inner center circumferential groove have groove widths narrower than a groove width of the outer shoulder circumferential groove and a groove width of the inner shoulder circumferential groove, respectively.

A second aspect of the present invention provides the pneumatic tire according to the first aspect, in which the groove width of the outer shoulder circumferential groove and the groove width of the inner shoulder circumferential groove are 1.2 times or more and 4.0 times or less a groove width of the outer center circumferential groove and a groove width of the inner center circumferential groove, respectively.

A third aspect of the present invention provides the pneumatic tire according to the second aspect, in which each of the outer center circumferential groove and the inner center circumferential groove has a groove width of 3.0 mm or more and 9.0 mm or less.

A fourth aspect of the present invention provides the pneumatic tire according to any one of the first to third aspects, wherein a groove width of the outer shoulder circumferential groove is narrower than the groove width of the inner shoulder circumferential groove.

A fifth aspect of the present invention provides the pneumatic tire according to any one of first to the fourth aspects, in which the pneumatic tire includes on the tread:
    a plurality of inner quarter lateral grooves that are positioned spaced apart from each other in the tire circumferential direction, and that extend in the tire axis direction, between the inner shoulder circumferential groove and the inner center circumferential groove;

a plurality of inner shoulder lateral grooves that are positioned spaced apart from each other in the tire circumferential direction, and that that extend in the tire axis direction, between the inner shoulder circumferential groove and an axle-direction inner grounding end of the tread;

an outer shoulder rib that is defined on an outer side with respect to the outer shoulder circumferential groove in the axle direction by the outer shoulder circumferential groove;

an outer quarter rib that is defined between the outer shoulder circumferential groove and the outer center circumferential groove;

a plurality of inner quarter blocks that are defined between the inner shoulder circumferential groove and the inner center circumferential groove, and defined in the tire circumferential direction by the plurality of inner quarter lateral grooves; and a plurality of inner shoulder blocks that are defined on an inner side with respect to the inner shoulder circumferential groove in the axle direction by the inner shoulder circumferential groove, and defined in the tire circumferential direction by the plurality of inner shoulder lateral grooves.

A sixth aspect of the present invention provides the pneumatic tire according to the fifth aspect, in which the inner center circumferential groove has a groove width narrower than a groove width of the outer center circumferential groove.

A seventh aspect of the present invention provides the pneumatic tire according to the fifth aspect or the sixth aspect, in which each of the plurality of inner shoulder blocks has an inner shoulder sipe extending inwardly in the axle direction from the inner shoulder circumferential groove, and terminated at a position spaced apart from the axle-direction inner grounding end.

An eighth aspect of the present invention provides the pneumatic tire according to the fifth to seventh aspect, in which the outer quarter rib includes:

a plurality of outer quarter sipes that are positioned spaced apart from each other along the tire circumferential direction, that extend in the tire axis direction, and that connect the outer shoulder circumferential groove and the outer center circumferential groove; and an outer quarter notch recessed inwardly in the axle direction from the outer shoulder circumferential groove, between the plurality of outer quarter sipes.

A ninth aspect of the present invention provides the pneumatic tire according to the eighth aspect, in which groove depths of the plurality of outer quarter sipes are shallower at a center in the tire axis direction than groove depths on respective ends in the tire axis direction.

A tenth aspect of the present invention provides the pneumatic tire according to the eighth aspect or the ninth aspect in which each of the plurality of outer quarter sipes includes:

a deep groove portion having a groove depth of 60% or more and 90% or less the groove depths of the outer shoulder circumferential groove and the outer center circumferential groove; and a shallow groove portion having a groove depth of 20% or more and 40% or less the groove depths of the outer shoulder circumferential groove and the outer center circumferential groove.

An eleventh aspect of the present invention provides the pneumatic tire according to any one of the fifth to tenth aspects, in which the outer shoulder rib includes:

a plurality of first outer shoulder slits that extend from the outer shoulder circumferential groove in the tire axis direction and that are terminated inside the outer shoulder rib; and a plurality of second outer shoulder slits that extend in the tire axis direction from an axle-direction outer grounding end of the tread and that are terminated inside the outer shoulder rib.

A twelfth aspect of the present invention provides the pneumatic tire according to the eleventh aspect, in which the plurality of first outer shoulder slits have groove depths of 50% or more and 100% or less the groove depth of the outer shoulder circumferential groove.

A thirteenth aspect of the present invention provides the pneumatic tire according to the eleventh or twelfth aspect, in which the plurality of second outer shoulder slits may have groove depths of 20% or more and 40% or less the groove depth of the outer shoulder circumferential groove.

A fourteenth aspect of the present invention provides the pneumatic tire according to any one of the eleventh to thirteenth aspects, in which lengths of the plurality of first outer shoulder slits and the plurality of second outer shoulder slits along the tire axis direction are 20% or more and 60% or less the width of the outer shoulder rib.

A fifteenth aspect of the present invention provides the pneumatic tire according to any one of the first to fourteenth aspects, in which the pneumatic tire further comprising on the tread:

a plurality of center lateral grooves that are positioned spaced apart from each other in the tire circumferential direction, and that connect the inner center circumferential groove and the outer center circumferential groove in the tire axis direction;

a plurality of inner quarter lateral grooves that are positioned spaced apart from each other in the tire circumferential direction, and that connect the inner center circumferential groove and the inner shoulder circumferential groove in the tire axis direction;

a plurality of inner shoulder lateral grooves that are positioned spaced apart from each other in the tire circumferential direction, and that connect the inner shoulder circumferential groove and an axle-direction inner grounding end of the tread, in the tire axis direction;

a plurality of center blocks that are defined between the inner center circumferential groove and the outer center circumferential groove, and defined in the tire circumferential direction by the plurality of center lateral grooves;

a plurality of inner quarter blocks that are defined between the inner center circumferential groove and the inner shoulder circumferential groove, and defined in the tire circumferential direction by the plurality of inner quarter lateral grooves;

a plurality of inner shoulder blocks that are defined on an inner side with respect to the inner shoulder circumferential groove in the axle direction, and defined in the tire circumferential direction by the plurality of inner shoulder lateral grooves;

a center sipe that connects the inner center circumferential groove and the outer center circumferential groove in the tire axis direction in each of the plurality of center blocks; and an inner shoulder notch that extends inwardly, in each of the plurality of inner shoulder blocks, in the axle direction from the inner shoulder circumferential groove, and that is terminated inside the inner shoulder block, wherein the plurality of inner quarter lateral grooves also include:

a first quarter lateral groove that is positioned on an extension of the center lateral groove and on an extension of the inner shoulder notch; and a second quarter lateral groove that is positioned on an extension of the center sipe and on an extension of the inner shoulder lateral groove.

A sixteenth aspect of the present invention provides the pneumatic tire according to the fifteenth aspect, in which a groove depth of the center sipe is shallower on both ends in the tire axis direction than a groove depth at the center in the tire axis direction.

A seventeenth aspect of the present invention provides the pneumatic tire according to the fifteenth aspect or the sixteenth aspect, in which the center sipe includes:

a deep groove portion having a groove depth of 60% or more and 90% or less the groove depth of the inner center circumferential groove and the outer center circumferential groove; and a shallow groove portion having a groove depth of 20% or more and 40% or less the groove depth of the inner center circumferential groove and the outer center circumferential groove.

A eighteenth aspect of the present invention provides the pneumatic tire according to any one of the fifteenth to seventeenth aspects, the pneumatic tire further comprising:

an outer quarter rib that is defined between the outer shoulder circumferential groove and the outer center circumferential groove; and an outer shoulder rib that is defined on the outer side with respect to the outer shoulder circumferential groove in the axle direction by the outer shoulder circumferential groove.

A nineteenth aspect of the present invention provides the pneumatic tire according to any one of the first to fourteenth aspects, in which the pneumatic tire further comprising on the tread:

a plurality of deep center lateral grooves and a plurality of shallow center lateral grooves that are alternately positioned spaced from each other in the tire circumferential direction, that connect the inner center circumferential groove and the outer center circumferential groove in the tire axis direction, and that have the same groove width;

a plurality of wide inner quarter lateral grooves and a plurality of narrow inner quarter lateral grooves that are positioned spaced from each other in the tire circumferential direction, and that connect the inner center circumferential groove and the inner shoulder circumferential groove in the tire axis direction; and a plurality of inner shoulder lateral grooves that are positioned spaced apart from each other in the tire circumferential direction, and that connect the inner shoulder circumferential groove and an axle-direction inner grounding end of the tread in the tire axis direction, wherein each of the plurality of deep center lateral grooves has a groove depth of 50% or more and 100% or less groove depths of the inner center circumferential groove and the outer center circumferential groove, each of the plurality of shallow center lateral grooves has a groove depth of 5% or more and 20% or less the groove depths of the inner center circumferential groove and the outer center circumferential groove, a groove depth of each of the plurality of wide inner quarter lateral grooves is 50% or more and 100% or less the groove depth of the inner center circumferential groove, a groove depth of each of the plurality of narrow inner quarter lateral grooves is 5% or more and 20% or less the groove depth of the inner center circumferential groove, and a groove depth of each of the plurality of inner shoulder lateral grooves is 20% or more and 50% or less a groove depth of the inner shoulder circumferential groove.

A twentieth aspect of the present invention provides the pneumatic tire according to the nineteenth aspect, in which the pneumatic tire further comprising on the tread:

a plurality of inner quarter blocks defined by the inner shoulder circumferential groove, the inner center circumferential groove, the plurality of wide inner quarter lateral grooves, and the plurality of narrow inner quarter lateral grooves;

a plurality of inner shoulder blocks that are defined on an inner side with respect to the inner shoulder circumferential groove in the axle direction, and defined in the tire circumferential direction by the plurality of inner shoulder lateral grooves;

an outer quarter rib that is defined between the outer shoulder circumferential groove and the outer center circumferential groove; and an outer shoulder rib that is defined on an outer side with respect to the outer shoulder circumferential groove in the axle direction by the outer shoulder

What is claimed is:

1. A pneumatic tire comprising on a tread:

an outer center circumferential groove that is positioned on an outer side with respect to a tire equator in an axle direction in an vehicle-mounted state, and that extends in a tire circumferential direction;

an inner center circumferential groove that is positioned on an inner side with respect to the tire equator in the axle direction in the vehicle-mounted state, and that extends in the tire circumferential direction;

an outer shoulder circumferential groove that is positioned on an outer side with respect to the outer center circumferential groove in the axle direction in the vehicle-mounted state, and that linearly extends in the tire circumferential direction; and an inner shoulder circumferential groove that is positioned on an inner side with respect to the inner center circumferential groove in the axle direction in the vehicle-mounted state, and that extends in a zig-zag pattern in the tire circumferential direction, wherein the outer center circumferential groove and the inner center circumferential groove have groove widths narrower than a groove width of the outer shoulder circumferential groove and a groove width of the inner shoulder circumferential groove, respectively, and wherein the groove width of the outer shoulder circumferential groove is narrower than the groove width of the inner shoulder circumferential groove.

2. The pneumatic tire according to claim 1, wherein the groove width of the outer shoulder circumferential groove and the groove width of the inner shoulder circumferential groove are 1.2 times or more and 4.0 times or less a groove width of the outer center circumferential groove and the inner center circumferential groove, respectively.

3. The pneumatic tire according to claim 2, wherein each of the outer center circumferential groove and the inner center circumferential groove has a groove width of 3.0 mm or more and 9.0 mm or less.

4. The pneumatic tire according to claim 1, further comprising on the tread:
a plurality of deep center lateral grooves and a plurality of shallow center lateral grooves that are alternately positioned spaced from each other in the tire circumferential direction, that connect the inner center circumferential groove and the outer center circumferential groove in the tire axis direction, and that have the same groove width;
a plurality of wide inner quarter lateral grooves and a plurality of narrow inner quarter lateral grooves that are positioned spaced from each other in the tire circumferential direction, and that connect the inner center circumferential groove and the inner shoulder circumferential groove in the tire axis direction; and
a plurality of inner shoulder lateral grooves that are positioned spaced apart from each other in the tire circumferential direction, and that connect the inner shoulder circumferential groove and an axle-direction inner grounding end of the tread in the tire axis direction,
wherein each of the plurality of deep center lateral grooves has a groove depth of 50% or more and 100% or less groove depths of the inner center circumferential groove and the outer center circumferential groove,
each of the plurality of shallow center lateral grooves has a groove depth of 5% or more and 20% or less the groove depths of the inner center circumferential groove and the outer center circumferential groove,
a groove depth of each of the plurality of wide inner quarter lateral grooves is 50% or more and 100% or less the groove depth of the inner center circumferential groove,
a groove depth of each of the plurality of narrow inner quarter lateral grooves is 5% or more and 20% or less the groove depth of the inner center circumferential groove, and
a groove depth of each of the plurality of inner shoulder lateral grooves is 20% or more and 50% or less a groove depth of the inner shoulder circumferential groove.

5. The pneumatic tire according to claim 4, further comprising on the tread:
a plurality of inner quarter blocks defined by the inner shoulder circumferential groove, the inner center circumferential groove, the plurality of wide inner quarter lateral grooves, and the plurality of narrow inner quarter lateral grooves;
a plurality of inner shoulder blocks that are defined on an inner side with respect to the inner shoulder circumferential groove in the axle direction, and defined in the tire circumferential direction by the plurality of inner shoulder lateral grooves;
an outer quarter rib that is defined between the outer shoulder circumferential groove and the outer center circumferential groove; and
an outer shoulder rib that is defined on an outer side with respect to the outer shoulder circumferential groove in the axle direction by the outer shoulder circumferential groove.

6. A pneumatic tire comprising on a tread:
an outer center circumferential groove that is positioned on an outer side with respect to a tire equator in an axle direction in an vehicle-mounted state, and that extends in a tire circumferential direction;
an inner center circumferential groove that is positioned on an inner side with respect to the tire equator in the axle direction in the vehicle-mounted state, and that extends in the tire circumferential direction;
an outer shoulder circumferential groove that is positioned on an outer side with respect to the outer center circumferential groove in the axle direction in the vehicle-mounted state, and that linearly extends in the tire circumferential direction;
an inner shoulder circumferential groove that is positioned on an inner side with respect to the inner center circumferential groove in the axle direction in the vehicle-mounted state, and that extends in a zig-zag pattern in the tire circumferential direction;
a plurality of inner quarter lateral grooves that are positioned spaced apart from each other in the tire circumferential direction, and that extend in the tire axis direction, between the inner shoulder circumferential groove and the inner center circumferential groove;
a plurality of inner shoulder lateral grooves that are positioned spaced apart from each other in the tire circumferential direction, and that that extend in the tire axis direction, between the inner shoulder circumferential groove and an axle-direction inner grounding end of the tread;
an outer shoulder rib that is defined on an outer side with respect to the outer shoulder circumferential groove in the axle direction by the outer shoulder circumferential groove;
an outer quarter rib that is defined between the outer shoulder circumferential groove and the outer center circumferential groove;
a plurality of inner quarter blocks that are defined between the inner shoulder circumferential groove and the inner center circumferential groove, and defined in the tire circumferential direction by the plurality of inner quarter lateral grooves; and
a plurality of inner shoulder blocks that are defined on an inner side with respect to the inner shoulder circumferential groove in the axle direction by the inner shoulder circumferential groove, and defined in the tire circumferential direction by the plurality of inner shoulder lateral grooves,
wherein the outer center circumferential groove and the inner center circumferential groove have groove widths narrower than a groove width of the outer shoulder circumferential groove and a groove width of the inner shoulder circumferential groove, respectively.

7. The pneumatic tire according to claim 6, wherein the inner center circumferential groove has a groove width narrower than a groove width of the outer center circumferential groove.

8. The pneumatic tire according to claim 6, wherein each of the plurality of inner shoulder blocks has an inner shoulder sipe extending inwardly in the axle direction from the inner shoulder circumferential groove, and terminated at a position spaced apart from the axle-direction inner grounding end.

9. The pneumatic tire according to claim 6, wherein the outer quarter rib includes:
a plurality of outer quarter sipes that are positioned spaced apart from each other in the tire circumferential direction, that extend in the tire axis direction, and that connect the outer shoulder circumferential groove and the outer center circumferential groove; and an outer quarter notch recessed inwardly in the axle direction from the outer shoulder circumferential groove, between the plurality of outer quarter sipes.

10. The pneumatic tire according to claim 9, wherein groove depths of the plurality of outer quarter sipes are shallower at a center in the tire axis direction than groove depths on respective ends in the tire axis direction.

11. The pneumatic tire according to claim 9, wherein each of the plurality of outer quarter sipes includes:
- a deep groove portion having a groove depth of 60% or more and 90% or less the groove depths of the outer shoulder circumferential groove and the outer center circumferential groove; and
- a shallow groove portion having a groove depth of 20% or more and 40% or less the groove depths of the outer shoulder circumferential groove and the outer center circumferential groove.

12. The pneumatic tire according to claim 6, wherein the outer shoulder rib includes:
- a plurality of first outer shoulder slits that extend from the outer shoulder circumferential groove in the tire axis direction and that are terminated inside the outer shoulder rib; and
- a plurality of second outer shoulder slits that extend in the tire axis direction from an axle-direction outer grounding end of the tread and that are terminated inside the outer shoulder rib.

13. The pneumatic tire according to claim 12, wherein the plurality of first outer shoulder slits have groove depths of 50% or more and 100% or less the groove depth of the outer shoulder circumferential groove.

14. The pneumatic tire according to claim 12, wherein the plurality of second outer shoulder slits have groove depths of 20% or more and 40% or less the groove depth of the outer shoulder circumferential groove.

15. The pneumatic tire according to claim 12, wherein lengths of the plurality of first outer shoulder slits and the plurality of second outer shoulder slits along the tire axis direction are 20% or more and 60% or less the width of the outer shoulder rib.

16. A pneumatic tire comprising on a tread:
- an outer center circumferential groove that is positioned on an outer side with respect to a tire equator in an axle direction in an vehicle-mounted state, and that extends in a tire circumferential direction;
- an inner center circumferential groove that is positioned on an inner side with respect to the tire equator in the axle direction in the vehicle-mounted state, and that extends in the tire circumferential direction;
- an outer shoulder circumferential groove that is positioned on an outer side with respect to the outer center circumferential groove in the axle direction in the vehicle-mounted state, and that linearly extends in the tire circumferential direction;
- an inner shoulder circumferential groove that is positioned on an inner side with respect to the inner center circumferential groove in the axle direction in the vehicle-mounted state, and that extends in a zig-zag pattern in the tire circumferential direction;
- a plurality of center lateral grooves that are positioned spaced apart from each other in the tire circumferential direction, and that connect the inner center circumferential groove and the outer center circumferential groove in the tire axis direction;
- a plurality of inner quarter lateral grooves that are positioned spaced apart from each other in the tire circumferential direction, and that connect the inner center circumferential groove and the inner shoulder circumferential groove in the tire axis direction;
- a plurality of inner shoulder lateral grooves that are positioned spaced apart from each other in the tire circumferential direction, and that connect the inner shoulder circumferential groove and an axle-direction inner grounding end of the tread, in the tire axis direction;
- a plurality of center blocks that are defined between the inner center circumferential groove and the outer center circumferential groove, and defined in the tire circumferential direction by the plurality of center lateral grooves;
- a plurality of inner quarter blocks that are defined between the inner center circumferential groove and the inner shoulder circumferential groove, and defined in the tire circumferential direction by the plurality of inner quarter lateral grooves;
- a plurality of inner shoulder blocks that are defined on an inner side with respect to the inner shoulder circumferential groove in the axle direction, and defined in the tire circumferential direction by the plurality of inner shoulder lateral grooves;
- a center sipe that connects the inner center circumferential groove and the outer center circumferential groove in the tire axis direction in each of the plurality of center blocks; and
- an inner shoulder notch that extends inwardly, in each of the plurality of inner shoulder blocks, in the axle direction from the inner shoulder circumferential groove, and that is terminated inside the inner shoulder block,
wherein the outer center circumferential groove and the inner center circumferential groove have groove widths narrower than a groove width of the outer shoulder circumferential groove and a groove width of the inner shoulder circumferential groove, respectively, and
wherein the plurality of inner quarter lateral grooves also include:
- a first quarter lateral groove that is positioned on an extension of the center lateral groove and on an extension of the inner shoulder notch; and
- a second quarter lateral groove that is positioned on an extension of the center sipe and on an extension of the inner shoulder lateral groove.

17. The pneumatic tire according to claim 16, wherein a groove depth of the center sipe is shallower on both ends in the tire axis direction than a groove depth at the center in the tire axis direction.

18. The pneumatic tire according to claim 16, wherein the center sipe includes:
- a deep groove portion having a groove depth of 60% or more and 90% or less the groove depth of the inner center circumferential groove and the outer center circumferential groove; and
- a shallow groove portion having a groove depth of 20% or more and 40% or less the groove depth of the inner center circumferential groove and the outer center circumferential groove.

19. The pneumatic tire according to claim 16, further comprising:
- an outer quarter rib that is defined between the outer shoulder circumferential groove and the outer center circumferential groove; and an outer shoulder rib that is defined on the outer side with respect to the outer shoulder circumferential groove in the axle direction by the outer shoulder circumferential groove.

\* \* \* \* \*